(12) United States Patent
Ichikawa et al.

(10) Patent No.: US 8,154,254 B2
(45) Date of Patent: Apr. 10, 2012

(54) POWER SUPPLY SYSTEM PROVIDING ELECTRIC POWER TO A VEHICLE AND VEHICLE INCLUDING THE SAME

(75) Inventors: Shinji Ichikawa, Toyota (JP); Tetsuhiro Ishikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 510 days.

(21) Appl. No.: 12/311,183

(22) PCT Filed: Sep. 12, 2007

(86) PCT No.: PCT/JP2007/068222
§ 371 (c)(1),
(2), (4) Date: Mar. 20, 2009

(87) PCT Pub. No.: WO2008/053644
PCT Pub. Date: May 8, 2008

(65) Prior Publication Data
US 2010/0019728 A1    Jan. 28, 2010

(30) Foreign Application Priority Data
Nov. 1, 2006  (JP) .................................. 2006-297751

(51) Int. Cl.
*H02J 7/00* (2006.01)
(52) U.S. Cl. ....................................... 320/134; 320/144
(58) Field of Classification Search .................. 320/109, 320/134
See application file for complete search history.

(56) References Cited

U.S. PATENT DOCUMENTS

| | | | | |
|---|---|---|---|---|
| 5,710,507 A | * | 1/1998 | Rosenbluth et al. | 307/66 |
| 6,218,643 B1 | * | 4/2001 | Iwata et al. | 219/202 |
| 6,583,519 B2 | * | 6/2003 | Aberle et al. | 307/10.1 |
| 6,624,615 B1 | * | 9/2003 | Park | 320/150 |
| 6,674,263 B2 | * | 1/2004 | Agbossou et al. | 320/101 |
| 2002/0014869 A1 | | 2/2002 | Omata et al. | |
| 2003/0231005 A1 | | 12/2003 | Kohama et al. | |

(Continued)

FOREIGN PATENT DOCUMENTS
CN  1599125 A  3/2005
(Continued)

OTHER PUBLICATIONS
Extended Search Report issued in corresponding European Application No. 07807590.0 dated Mar. 7, 2011.
(Continued)

*Primary Examiner* — Arun Williams
(74) *Attorney, Agent, or Firm* — Oliff & Berridge, PLC

(57) ABSTRACT

A converter ECU obtains a temperature increase start signal indicating start of temperature increase of a power storage unit from each sensor and ECU provided in a vehicle. In addition, the converter ECU obtains allowable electric power of the power storage unit from a battery ECU and obtains a power storage unit temperature from a temperature detection unit. When any of the obtained power storage unit temperatures is lower than a corresponding temperature lower limit value, the converter ECU generates a temperature increase instruction for the power storage unit of which temperature is lower than the corresponding temperature lower limit value, based on the temperature increase start signal. In addition, the converter ECU selects one control mode from among a plurality of control modes set in advance, based on the generated temperature increase instruction, and sets that mode as the control mode for a converter.

17 Claims, 13 Drawing Sheets

U.S. PATENT DOCUMENTS

| | | | |
|---|---|---|---|
| 2004/0178768 A1* | 9/2004 | Miyazaki et al. | 320/116 |
| 2005/0196662 A1 | 9/2005 | Prema et al. | |
| 2007/0018780 A1* | 1/2007 | Furukawa et al. | 338/104 |
| 2007/0114954 A1* | 5/2007 | Hampo et al. | 318/105 |

FOREIGN PATENT DOCUMENTS

| | | |
|---|---|---|
| EP | 2 043 244 A1 | 4/2009 |
| JP | A-10-167029 | 6/1998 |
| JP | A-11-026032 | 1/1999 |
| JP | A-2001-268715 | 9/2001 |
| JP | A-2001-294136 | 10/2001 |
| JP | A-2002-058112 | 2/2002 |
| JP | A-2004-026139 | 1/2004 |
| JP | A-2004-126139 | 1/2004 |
| JP | A-2005-176484 | 6/2005 |
| WO | WO 2007/125673 A1 | 11/2007 |

OTHER PUBLICATIONS

Chinese Office Action dated Nov. 15, 2010 in corresponding Chinese Patent Application No. 200780040371.0 (with translation).

* cited by examiner

FIG.4

| TEMPERATURE INCREASE INSTRUCTION | TEMPERATURE INCREASE START SIGNAL | CONVERTER CONTROL MODE |
|---|---|---|
| WCMA | SMART DOOR UNLOCK SIGNAL (SDU) | RATE-ORIENTED MODE (MDA) |
| WCMB | KEYLESS DOOR UNLOCK SIGNAL (KDU) | RATE-ORIENTED MODE (MDA) |
| WCMC | MANUALLY OPERATED TEMPERATURE INCREASE BUTTON ON SIGNAL (BON1) | RATE-ORIENTED MODE (MDA) |
| WCMD | CHARGE CONNECTOR OPENING SIGNAL (OP) | SEMI-RATE-ORIENTED MODE (MDB) |
| WCME | REMOTELY OPERATED TEMPERATURE INCREASE BUTTON ON SIGNAL (BON2) | EFFICIENCY-ORIENTED MODE (MDC) |
| WCMF | TEMPERATURE INCREASE REQUEST SIGNAL FROM HOUSE (DMN) | EXTERNAL CHARGE MODE (MDD) |
| WCMG | TIMER OUTPUT SIGNAL (TM) | TIME MANAGEMENT MODE (MDE) |

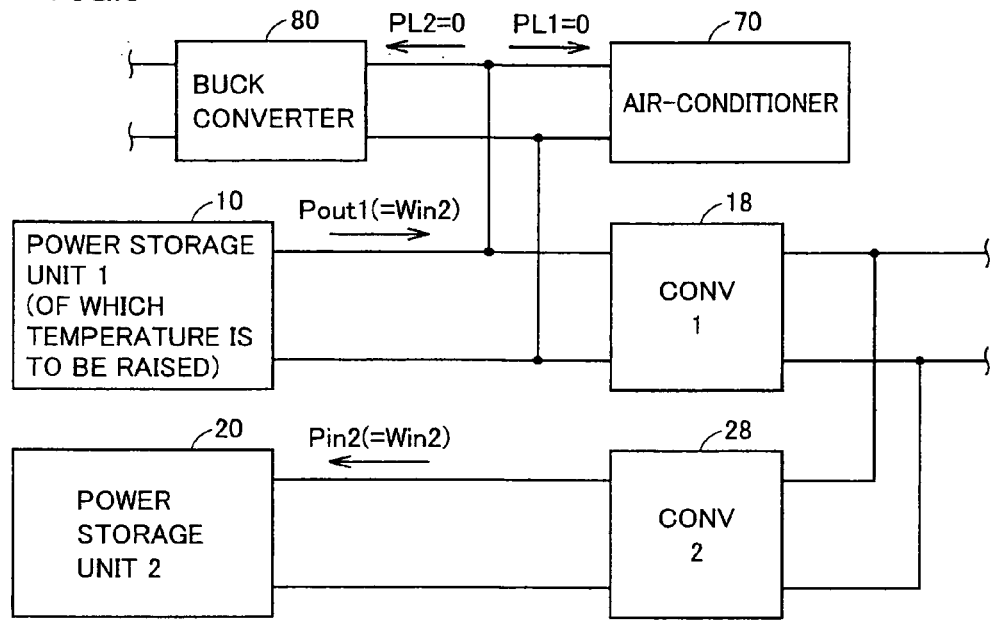
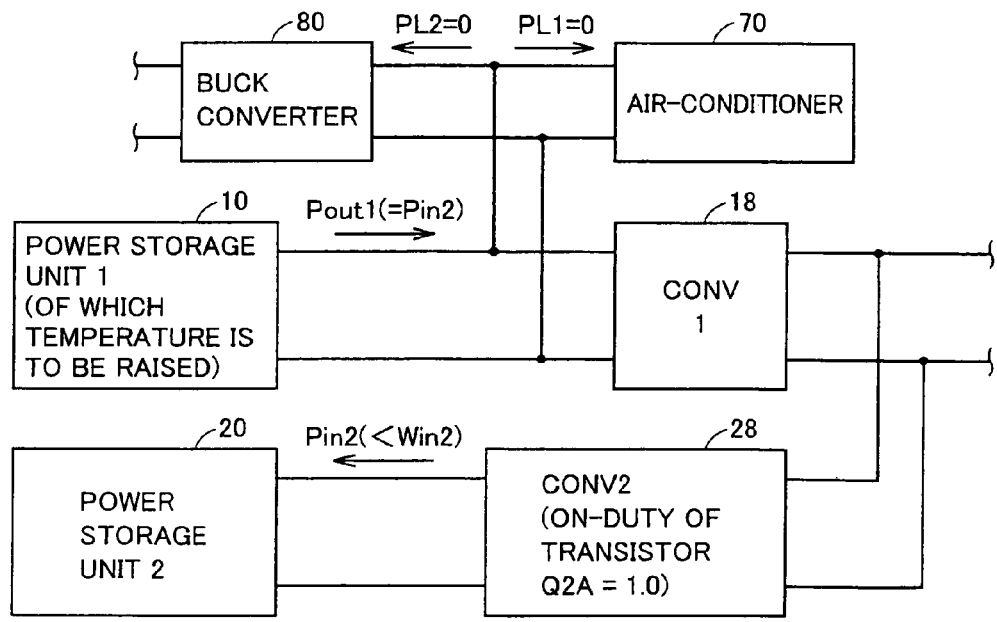

POWER SUPPLY SYSTEM PROVIDING ELECTRIC POWER TO A VEHICLE AND VEHICLE INCLUDING THE SAME

TECHNICAL FIELD

The present invention relates to a power supply system and a vehicle including the same, and more particularly to a power supply system having a plurality of power storage units and a vehicle including the same.

BACKGROUND ART

Recently, considering environmental issues, attention has been paid to a vehicle employing a motor as a drive power source, such as an electric vehicle, a hybrid vehicle and a fuel cell vehicle. Such a vehicle includes a power storage unit implemented, for example, by a secondary battery or an electric double layer capacitor for supplying electric power to the motor, and converting kinetic energy to electric energy during regenerative braking and storing such electric power.

In such a vehicle employing the motor as the drive force source, in order to enhance acceleration performance and running performance such as travel distance, greater charge/discharge capacity of the power storage unit is desired. Here, a configuration where a plurality of power storage units are mounted has been proposed as a method of increasing the charge/discharge capacity of the power storage unit.

On the other hand, as the power storage unit stores electric energy utilizing electrochemical action, charge/discharge characteristics thereof are susceptible to a temperature. A general power storage unit is lower in the charge/discharge performance as the temperature is lower. Accordingly, in order to maintain prescribed charge/discharge performance, temperature management, in particular temperature increase control, of the power storage unit is important.

For example, Japanese Patent Laying-Open No. 11-26032 discloses a heating-up device for a battery in an electric vehicle, that raises a temperature of the battery mounted on the electric vehicle. According to this device, if a detected temperature of the battery is equal to or lower than a prescribed value when an instruction is issued from at least one of unlock detection means for detecting unlock of the vehicle, timer means for notification of a set time, and input means for input of operational information, control means carries out control such that an output current of the battery greater than a current required in the battery flows.

Though the heating-up device disclosed in Japanese Patent Laying-Open No. 11-26032 carries out control such that the output current of the battery greater than the required current flows when an instruction is issued from at least one of the unlock detection means, the timer means, and the input means described above, this publication does not provide sufficient disclosure of detailed control of the output current.

In other words, though it is effective to increase the output current of the battery from a viewpoint of increase in an amount of heat generation within the battery for promoting rapid temperature increase in the battery, on the other hand, it may lead to such disadvantages that electric power taken out of the battery or electric power loss caused in a converter or the like increases and energy efficiency of the entire power supply system is lowered. Therefore, in order to enhance running performance of the vehicle, rapid temperature increase of the battery while ensuring improvement in energy efficiency is required.

Japanese Patent Laying-Open No. 11-26032 described above, however, merely discloses a configuration for carrying out control for uniformly increasing the output current of the battery in any of a case that the vehicle is unlocked, a case that a set time has come, and a case that an operation through a remote controller from inside of a vehicle is input, and this publication is silent about means for solving these problems.

Therefore, the present invention was made to solve such problems, and an object of the present invention is to provide a power supply system capable of rapidly raising a temperature of a power storage unit while ensuring improvement in energy efficiency.

In addition, another object of the present invention is to provide a vehicle including a power supply system capable of rapidly raising a temperature of a power storage unit while ensuring improvement in energy efficiency.

DISCLOSURE OF THE INVENTION

According to one aspect of the present invention, a power supply system is a power supply system supplying electric power to a load device mounted on a vehicle. The power supply system includes a power storage mechanism configured to be charged and a control device carrying out temperature increase control of the power storage mechanism in response to a temperature increase start instruction indicating start of temperature increase for the power storage mechanism. The temperature increase start instruction includes a plurality of types of temperature increase start signals different from each other in a signal source. The control device includes mode selection means selecting one control mode from among a plurality of control modes set in advance, in accordance with a type of the temperature increase start signal, and temperature increase control means carrying out temperature increase control of the power storage mechanism in accordance with the control mode selected by the mode selection means.

According to the power supply system described above, temperature increase control of the power storage mechanism is carried out in accordance with the type of the temperature increase start signal such that a temperature increase rate of the power storage mechanism and entire energy efficiency are optimized, and therefore it is ensured that temperature increase control of the power storage mechanism will have been completed by the time of start of the vehicle while suppressing electric power loss. Consequently, improvement in energy efficiency in the power supply system and ensured starting capability of the vehicle can both be attained.

Preferably, the power storage mechanism includes a plurality of power storage units each configured to be charged. The power supply system further includes a power line configured to be capable of supplying and receiving electric power between the load device and the power supply system, and a plurality of voltage conversion units provided between the plurality of power storage units and the power line, respectively, and each performing a voltage conversion operation between the corresponding power storage unit and the power line. The temperature increase control means includes power storage unit temperature determination means determining whether each of temperatures of the plurality of power storage units is lower than a corresponding lower limit value of the temperature, and voltage conversion control means controlling the voltage conversion operation of the plurality of voltage conversion units such that a temperature of the power storage unit of which temperature has been determined as being lower than the temperature lower limit value is raised and electric power is supplied and received between the power storage unit, of which temperature is to be raised, and the remaining power storage unit or outside of the vehicle, in accordance with the control mode selected by the mode selection means.

According to the power supply system described above, temperature increase control of the power storage mechanism is carried out in accordance with the type of the temperature increase start signal such that a temperature increase rate of the power storage unit of which temperature is to be raised and entire energy efficiency are optimized, and therefore it is ensured that temperature increase control of the power storage mechanism will have been completed by the time of start of the vehicle while suppressing electric power loss. Consequently, improvement in energy efficiency in the power supply system and ensured starting capability of the vehicle can both be attained.

Preferably, the plurality of types of temperature increase start signals are categorized in accordance with an estimated value of a time period from transmission from the signal source until start of the vehicle. The mode selection means selects from among the plurality of control modes a first control mode in which a charge/discharge current of the power storage unit, of which temperature has been determined as being lower than the temperature lower limit value, becomes relatively large, in accordance with the temperature increase start signal corresponding to a relatively small estimated value of the time period until start of the vehicle.

According to the power supply system described above, as the temperature of the power storage unit of which temperature is to be raised can quickly be raised within a limited period of time before start of the vehicle, starting capability of the vehicle can be ensured.

Preferably, the voltage conversion control means controls, when the mode selection means selects the first control mode and the power storage unit, of which temperature is to be raised, is in a low-charge state, the voltage conversion operation of the voltage conversion unit corresponding to that power storage unit such that a target value of charge/discharge electric power of the power storage unit, of which temperature is to be raised, is set to charge/discharge allowable electric power of that power storage unit and charge/discharge electric power of the power storage unit, of which temperature is to be raised, attains to the target value.

According to the power supply system described above, while the power storage unit of which temperature is to be raised is in a low-charge state, the charge/discharge current of that power storage unit is maximized to promote rapid temperature increase, so that charge/discharge performance of that power storage unit can be ensured.

Preferably, the voltage conversion control means controls, when the mode selection means selects the first control mode and the power storage unit, of which temperature is to be raised, is in a non-low-charge state, the voltage conversion operation of the voltage conversion unit corresponding to that power storage unit such that a target value of charge/discharge electric power of the power storage unit, of which temperature is to be raised, is set lower than charge/discharge allowable electric power of that power storage unit and electric power loss in that power storage unit is equal to or smaller than a prescribed value as well as charge/discharge electric power of the power storage unit, of which temperature is to be raised, attains to the target value.

According to the power supply system described above, while the power storage unit of which temperature is to be raised is in a non-low-charge state, the temperature of that power storage unit can rapidly be raised while suppressing electric power loss within that power storage unit.

Preferably, the vehicle includes an auxiliary machinery load actuated upon receiving electric power from the power supply system. The voltage conversion control means supplies to the auxiliary machinery load, surplus electric power caused in supply and reception of electric power between the power storage unit, of which temperature is to be raised, and the remaining power storage unit.

According to the power supply system described above, the surplus electric power caused in temperature increase control is supplied to the auxiliary machinery load, so that an in-vehicle environment comfortable for a person in the vehicle can be provided by actuating the auxiliary machinery load while carrying out temperature increase control.

Preferably, the plurality of types of temperature increase start signals include a first temperature increase start signal transmitted in response to unlock of the vehicle as a result of actuation of a smart door unlock function mounted on the vehicle. The first temperature increase start signal corresponds to the relatively small estimated value of the time period until start of the vehicle.

According to the power supply system described above, as the temperature of the power storage unit can quickly be raised within a limited period of time from unlock of the vehicle until start of the vehicle, starting capability of the vehicle can be ensured.

Preferably, the plurality of types of temperature increase start signals include a second temperature increase start signal transmitted in response to unlock of the vehicle as a result of actuation of a wireless remote control function mounted on the vehicle. The second temperature increase start signal corresponds to the relatively small estimated value of the time period until start of the vehicle.

According to the power supply system described above, as the temperature of the power storage unit can quickly be raised within a limited period of time from unlock of the vehicle until start of the vehicle, starting capability of the vehicle can be ensured.

Preferably, the power supply system further includes operation means provided inside the vehicle, for outputting a temperature increase request in response to an operation by a user. The plurality of types of temperature increase start signals include a third temperature increase start signal transmitted in response to output of the temperature increase request by the operation means. The third temperature increase start signal corresponds to the relatively small estimated value of the time period until start of the vehicle.

According to the power supply system described above, as the temperature of the power storage unit can quickly be raised in response to the temperature increase request from the user, starting capability of the vehicle can be ensured.

Preferably, the power supply system further includes a connector configured such that electric power can be supplied and received between the power supply system and the outside of the vehicle by ensuring electrical connection between the power line and the outside of the vehicle. The plurality of types of temperature increase start signals include a fourth temperature increase start signal transmitted in response to cut-off of electrical connection between the power line and the outside of the vehicle as a result of opening of the connector. The mode selection means selects from among the plurality of control modes a second control mode in which balance of electric power supplied and received between the power storage unit of which temperature is to be raised and the remaining power storage unit is substantially zero, in accordance with the fourth temperature increase start signal.

According to the power supply system described above, consumption of stored electric power in the entire power supply system in temperature increase control can be suppressed, while ensuring rapid temperature increase of the power storage unit.

Preferably, the voltage conversion control means controls, when the mode selection means selects the second control mode, the voltage conversion operation of the plurality of voltage conversion units such that charge/discharge electric power of the power storage unit, of which temperature is to be raised, substantially matches with charge/discharge electric power of the remaining power storage unit.

According to the power supply system described above, as balance of electric power supplied and received between the power storage units attains to substantially zero, consumption of stored electric power in the entire power supply system can be suppressed.

Preferably, the mode selection means selects from among the plurality of control modes a third control mode in which electric power loss caused in the voltage conversion unit is relatively small, in accordance with the temperature increase start signal corresponding to a relatively large estimated value of the time period until start of the vehicle.

According to the power supply system described above, when it is determined that there is sufficient time before start of the vehicle, electric power loss is preferentially reduced rather than ensuring a rate of temperature increase, so that overall efficiency of the power supply system can be improved.

Preferably, each of the plurality of voltage conversion units includes a chopper circuit having at least one set of switching elements. The voltage conversion control means controls, when the mode selection means selects the third control mode, the voltage conversion operation of the voltage conversion unit corresponding to the remaining power storage unit such that a voltage conversion ratio of that voltage conversion unit attains to substantially 1.

According to the power supply system described above, as switching loss caused in the voltage conversion unit can be suppressed, overall efficiency of the power supply system can be improved.

Preferably, the power supply system further includes operation means for outputting a temperature increase request in response to a remote operation by a user located outside the vehicle. The plurality of types of temperature increase start signals include a fifth temperature increase start signal transmitted in response to output of the temperature increase request by the operation means. The fifth temperature increase start signal corresponds to the relatively large estimated value of the time period until start of the vehicle.

According to the power supply system described above, electric power loss can be suppressed while ensuring that temperature increase control will have been completed by the time of start of the vehicle.

Preferably, the power supply system further includes a connector configured such that electric power can be supplied and received between the power supply system and the outside of the vehicle by ensuring electrical connection between the power line and the outside of the vehicle. The plurality of types of temperature increase start signals include a sixth temperature increase start signal transmitted in response to a temperature increase request from the outside of the vehicle. The mode selection means selects from among the plurality of control modes a fourth control mode for supplying and receiving electric power between the power storage unit, of which temperature is to be raised, and the outside of the vehicle, in accordance with the sixth temperature increase start signal.

According to the power supply system described above, when electric power can be supplied and received between the power supply system and the outside of the vehicle, electric power is supplied and received between the power storage unit of which temperature is to be raised and the outside of the vehicle, so that the temperature of the power storage unit can be raised without using electric power stored in the power supply system.

Preferably, the load device includes first and second rotating electric machines each configured to include star-connected stators, and first and second inverters electrically connected to the power line, for driving the first and second rotating electric machines respectively. The connector is configured such that electric power can be supplied and received between the power supply system and the outside of the vehicle through a first neutral point of the first rotating electric machine and a second neutral point of the second rotating electric machine. Each of the first and second inverters is configured to be capable of converting AC electric power supplied across the first neutral point and the second neutral point to DC electric power.

According to the power supply system described above, as the inverter driving the rotating electric machine can also serve as means for supplying electric power from the outside of the vehicle to the power storage unit, the configuration of the vehicle can be simplified.

Preferably, the power supply system further includes a timer for notification of a prescribed time that has been set in advance. The plurality of types of temperature increase start signals include a seventh temperature increase start signal transmitted in response to reception of the notification from the timer. The mode selection means selects from among the plurality of control modes a fifth control mode in which a charge/discharge current of the power storage unit, of which temperature is to be raised, varies at a prescribed increase rate that has been set in advance, in accordance with the seventh temperature increase start signal.

According to the power supply system described above, temperature increase control of the power storage unit is started at a prescribed time before the user starts the vehicle, so that starting capability of the vehicle in an environment at a low temperature can be ensured.

According to another aspect of the present invention, a vehicle includes the power supply system described in any one of the above and a drive force generation unit generating drive force by receiving electric power supplied from the power supply system.

According to the vehicle above, it is ensured that temperature increase control of the power storage unit will have been completed by the time of start of the vehicle, while ensuring improvement in energy efficiency, depending on a state of the vehicle, Consequently, running performance of the vehicle can be improved.

According to the present invention, rapid temperature increase of the power storage mechanism can be achieved while ensuring improvement in energy efficiency. Consequently, as charge/discharge performance of the power storage mechanism can be ensured, running performance of the vehicle can be improved.

BRIEF DESCRIPTION OF THE DRAWINGS

FIG. 4 is a diagram for illustrating a temperature increase instruction generated based on a temperature increase start signal and a control mode decided based on the generated temperature increase instruction.

FIG. 6 is a diagram for illustrating supply and reception of electric power when the converter operates in a semi-rate-oriented mode.

FIG. 7 is a diagram for illustrating supply and reception of electric power when the converter operates in an efficiency-oriented mode.

BEST MODES FOR CARRYING OUT THE INVENTION

Figure 1:
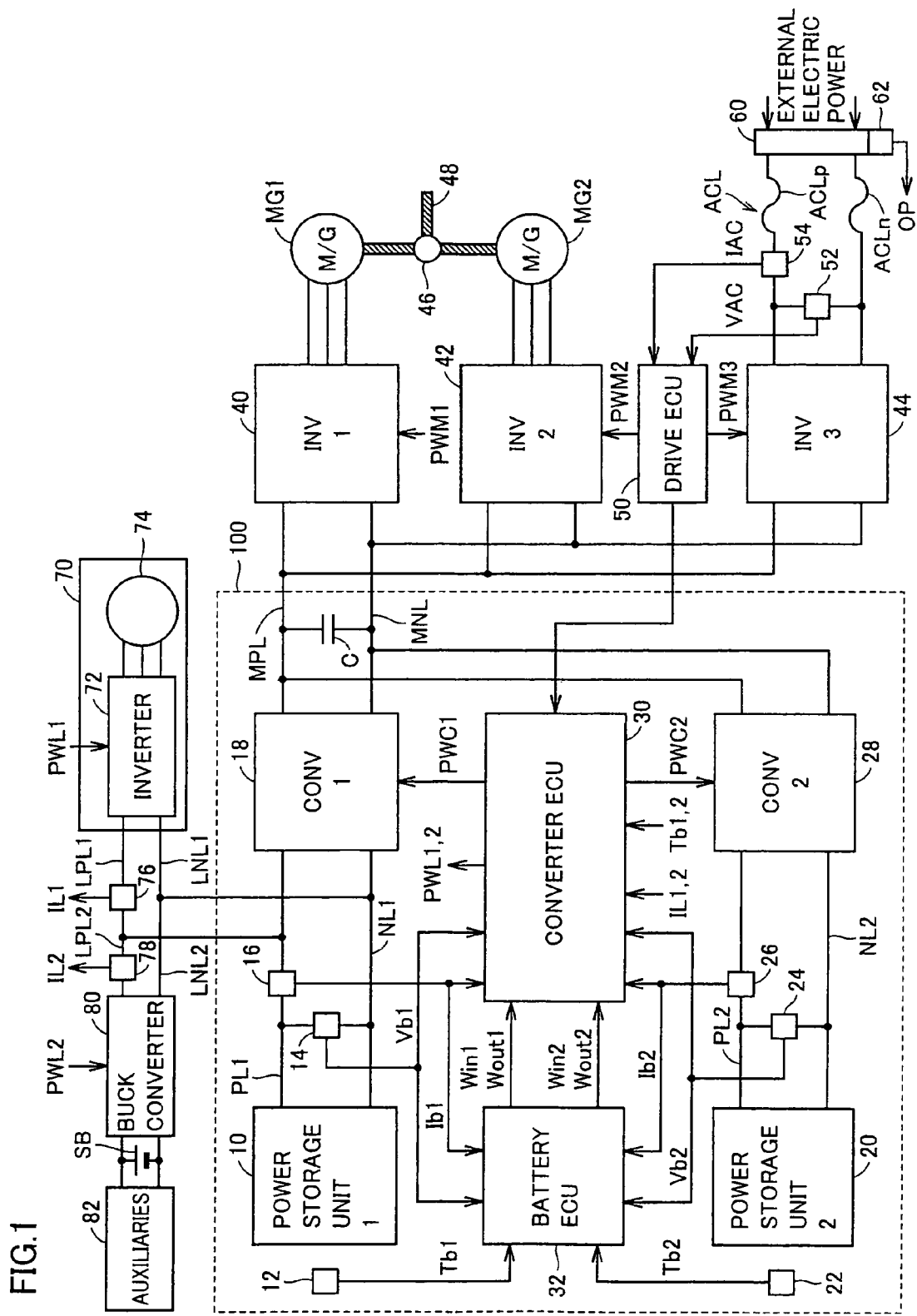
FIG. 1 is a schematic configuration diagram showing a substantial part of a vehicle including a power supply system according to an embodiment of the present invention.

An embodiment of the present invention will be described hereinafter in detail with reference to the drawings. It is noted that the same or corresponding elements have the same reference characters allotted in the drawings.

(Configuration of Vehicle)

FIG. 1 is a schematic configuration diagram showing a substantial part of a vehicle including a power supply system 100 according to an embodiment of the present invention.

Referring to FIG. 1, the vehicle includes power supply system 100, a first inverter (INV1) 40, a second inverter (INV2) 42, a third inverter (INV3) 44, motor-generators MG1, MG2, and a drive ECU (Electrical Control Unit) 50.

Inverters 40, 42, motor-generators MG1, MG2, and drive ECU 50 configure a drive force generation unit generating drive force of the vehicle. The present embodiment illustrates an example where the drive force generation unit serves as a "load device". Namely, the vehicle runs by transmitting to wheels (not shown), drive force generated by electric power supplied to the drive force generation unit from power supply system 100. In addition, during regeneration, the vehicle causes the drive force generation unit to generate electric power from kinetic energy and recovers the electric power in power supply system 100.

In the present embodiment, power supply system 100 including two power storage units as an example of the power storage unit constituting a power storage mechanism will be described. Power supply system 100 supplies and receives DC electric power to and from the drive force generation unit through a main positive bus MPL and a main negative bus MNL.

Inverters 40, 42 are connected in parallel to main positive bus MPL and main negative bus MNL, and supply/receive electric power to/from power supply system 100. That is, inverters 40, 42 convert drive electric power (DC electric power) received through main positive bus MPL and main negative bus MNL to AC electric power and supply the AC electric power to motor-generators MG1, MG2 respectively. In addition, inverters 40, 42 convert AC electric power generated by motor-generators MG1, MG2 to DC electric power and supply the resultant DC electric power as the regenerative electric power to power supply system 100. It is noted that, for example, inverters 40, 42 are constituted of a bridge circuit including switching elements of three phases, and generate three-phase AC electric power by performing a switching (circuit opening/closing) operation in response to switching instructions PWM1, PWM2 received from drive ECU 50.

Motor-generators MG1, MG2 are configured to be able to generate rotational drive force by receiving AC electric power supplied from inverters 40, 42 respectively and to be able to generate electric power by receiving external rotational drive force. For example, motor-generators MG1, MG2 are implemented by a three-phase AC electric rotating machine including a rotor having permanent magnets embedded. Motor-generators MG1, MG2 are coupled to a power split device 46, so as to transmit the generated drive force to wheels (not shown) via a drive shaft 48.

If the drive force generation unit is applied to a hybrid vehicle, motor-generators MG1, MG2 are also coupled to a not-shown engine through power split device 46 or drive shaft 48. Then, drive ECU 50 carries out control such that an optimal ratio between the drive force generated by the engine and the drive force generated by motor-generators MG1, MG2 is attained. If the drive force generation unit is applied to such a hybrid vehicle, motor-generator MG1 may serve solely as the generator, while motor-generator MG2 may serve solely as the motor.

Drive ECU 50 executes a program stored in advance, so as to calculate torque target values TR1, TR2 and speed target values MRN1, MRN2 of motor-generators MG1, MG2, based on a signal transmitted from each not-shown sensor, a running state, variation in an accelerator position, a stored map, or the like. Then, drive ECU 50 generates switching instructions PWM1, PWM2 and controls inverters 40, 42 such that generated torque and speed of motor-generators MG1, MG2 attain torque target values TR1, TR2 and speed target values MRN1, MRN2 respectively. In addition, drive ECU 50 outputs calculated torque target values TR1, TR2 and speed target values MRN1, MRN2 to power supply system 100.

In addition, in the present embodiment, inverter 44 is connected to main positive bus MPL and main negative bus MNL, in parallel to inverters 40, 42. Inverter 44 is further electrically connected to a commercial power supply (not shown) in a house outside the vehicle through a supply line ACL and a charge connector 60 such that electric power can be supplied and received to and from the commercial power supply.

Receiving commercial electric power supplied from the outside of the vehicle through charge connector 60 and supply line ACL, inverter 44 generates DC electric power for supply to power supply system 100 with a method which will be described later. For example, inverter 44 is implemented by a single-phase inverter so as to adapt to electric power used in the house (not shown) outside the vehicle.

A supply current detection unit 54 inserted in a positive supply line ACLp detects a supply current IAC from the commercial power supply and outputs the detected value to drive ECU 50. In addition, a supply voltage detection unit 52 connected between positive supply line ACLp and a negative supply line ACLn detects a supply voltage VAC from the commercial power supply and outputs the detected value to drive ECU 50.

In addition, an opening and closing detection unit 62 detects opening of charge connector 60, that is, electrical disconnection between the vehicle and the commercial power supply, generates a signal OP indicating the detected result, and outputs that signal to power supply system 100.

(Auxiliary Machinery Load)

The vehicle further includes an air-conditioner apparatus 70, low-voltage auxiliaries 82, a buck converter 80, and a sub power storage device SB.

Air-conditioner apparatus 70 is an apparatus for mainly air-conditioning the inside of the vehicle, and includes an inverter 72 connected to power supply lines LPL1, LNL1 and a compressor 74. Inverter 72 converts DC electric power from power supply system 100 to AC electric power and supplies the AC electric power to compressor 74. Compressor 74 is an apparatus for cooling with the use of heat of vaporization by repeating compression and expansion of a not-shown coolant, and compresses the coolant by generating rotational drive force by using the AC electric power supplied from inverter 72.

Low-voltage auxiliaries 82 are collective denotation of auxiliaries that are actuated at a voltage lower (for example, 12V) than an output voltage of power supply system 100. For example, low-voltage auxiliaries 82 include a car navigation system, a car audio system, an interior light, an indicator within a vehicle, and the like.

Such air-conditioner apparatus 70 and low-voltage auxiliaries 82 are auxiliary machinery loads for providing an in-vehicle environment comfortable for a person in the vehicle.

Buck converter 80 is connected to power supply lines LPL2, LNL2, down-converts DC electric power from power supply system 100 to a prescribed DC voltage, and supplies the resultant DC voltage to low-voltage auxiliaries 82 and sub power storage device SB.

Sub power storage device SB is implemented, for example, by a lead-acid battery, connected to an output side of buck converter 80, and charged with DC electric power from buck converter 80 while it supplies stored electric power to low-voltage auxiliaries 82. Namely, sub power storage device SB also has a function as an electric power buffer for compensating for unbalance between output electric power of buck converter 80 and electric power demanded by low-voltage auxiliaries 82.

A supply current detection unit 76 inserted in power supply line LPL1 detects a supply current IL1 to air-conditioner apparatus 70 and outputs the detected value to a converter ECU 30. In addition, a supply current detection unit 78 inserted in power supply line LPL2 detects a supply current IL2 to buck converter 80 and outputs the detected value to converter ECU 30.

(Configuration of Power Supply System)

Power supply system 100 includes a smoothing capacitor C, a first converter (CONV1) 18, a second converter (CONV2) 28, a first power storage unit 10, a second power storage unit 20, charge/discharge current detection units 16, 26, charge/discharge voltage detection units 14, 24, temperature detection units 12, 22, a battery ECU 32, and converter ECU 30.

Smoothing capacitor C is connected between main positive bus MPL and main negative bus MNL, and reduces a fluctuating component contained in drive electric power output from converters 18, 28 and regenerative electric power output from the drive force generation unit.

Converters 18, 28 are provided between main positive bus MPL, main negative bus MNL and power storage units 10, 20, and perform a voltage conversion operation between power storage units 10, 20 and main positive bus MPL, main negative bus MNL, respectively. More specifically, converters 18, 28 boost discharge electric power from power storage units 10, 20 to a prescribed voltage for supply as drive electric power, while they down-convert regenerative electric power supplied from the drive force generation unit to a prescribed voltage for charging power storage units 10, 20. For example, converters 18, 28 are implemented by a boost/buck chopper circuit.

Power storage units 10, 20 are connected in parallel to main positive bus MPL and main negative bus MNL with converters 18, 28 being interposed respectively. For example, power storage unit 10, 20 is implemented by a secondary battery configured to be capable of charge/discharge, such as a nickel metal hydride battery or a lithium-ion battery, or by an electric double layer capacitor.

Charge/discharge current detection units 16, 26 are inserted in the power lines connecting power storage units 10, 20 to converters 18, 28 respectively, detect charge/discharge current values Ib1, Ib2 used in charge/discharge of power storage units 10, 20 respectively, and output the result of detection to battery ECU 32 and converter ECU 30.

Charge/discharge voltage detection units 14, 24 are connected between the power lines connecting power storage units 10, 20 to converters 18, 28 respectively, detect charge/discharge voltage values Vb1, Vb2 of power storage units 10, 20 respectively, and output the result of detection to battery ECU 32 and converter ECU 30.

Temperature detection units 12, 22 are arranged in the proximity of battery cells and the like constituting power storage units 10, 20 respectively, detect power storage unit temperatures Tb1, Tb2 which represent internal temperatures of power storage units 10, 20, and output the result of detection to battery ECU 32. It is noted that temperature detection units 12, 22 may be configured to output a representative value obtained for example by averaging processing, based on the result of detection by a plurality of detection elements arranged in correspondence with a plurality of battery cells constituting power storage units 10, 20.

Battery ECU 32 calculates SOC1, SOC2 (State of Charge) in respective power storage units 10, 20, based on charge/discharge current values Ib1, Ib2 received from charge/discharge current detection units 16, 26, charge/discharge voltage values Vb1, Vb2 received from charge/discharge voltage detection units 14, 24, and power storage unit temperatures Tb1, Tb2 received from temperature detection units 12, 22.

Various well-known techniques may be employed for calculating SOC of power storage units 10, 20. For example, battery ECU 32 derives SOC by adding provisional SOC calculated from an open-circuit voltage value and corrective SOC calculated from an integrated value of the charge/discharge current values. More specifically, battery ECU 32 calculates the open-circuit voltage value of power storage units 10, 20 based on charge/discharge current values Ib1, Ib2 and charge/discharge voltage values Vb1, Vb2 at each time point, and applies the open-circuit voltage value to a reference charge/discharge characteristic indicating relation between the open-circuit voltage value and SOC in a reference state of power storage units 10, 20 that has experimentally been measured in advance, thereby calculating provisional SOC of power storage units 10, 20. Then, battery ECU 32 calculates corrective SOC by integrating charge/discharge current values Ib1, Ib2, and adds the corrective SOC to provisional SOC, thus deriving SOC.

In addition, battery ECU 32 derives allowable electric power (charge allowable electric power Win1, Win2 and discharge allowable electric power Wout1, Wout2) based on derived respective SOC1, SOC2 of power storage units 10, 20. Charge allowable electric power Win1, Win2 and discharge allowable electric power Wout1, Wout2 refer to restriction values of charge electric power and discharge electric power for a short period of time at each time point, that are defined by the limit in terms of chemical reaction.

Therefore, battery ECU 32 stores a map of the allowable electric power experimentally obtained in advance in SCO and power storage unit temperature Tb of power storage units 10, 20 are defined as parameters, and derives the allowable electric power at each time point based on calculated SOC1, SOC2 and power storage unit temperatures Tb1, Tb2. It is noted that the map defining the allowable electric power may include a parameter other than the SOC and the power storage unit temperature, such as degree of deterioration of the power storage unit.

Then, battery ECU 32 outputs to converter ECU 30, SOC1, SOC2, charge allowable electric power Win1, Win2 and discharge allowable electric power Wout1, Wout2 of power storage units 10, 20 that are derived.

Converter ECU 30 determines whether the temperature of power storage units 10, 20 should be raised or not based on power storage unit temperatures Tb1, Tb2 received from temperature detection units 12, 14, respectively. Specifically, converter ECU 30 determines whether each of power storage unit temperatures Tb1, Tb2 is lower than a corresponding temperature lower limit value (such as −15° C.). Then, converter ECU 30 carries out temperature increase control of the power storage unit of which temperature is lower than the corresponding temperature lower limit value.

Temperature increase control of the power storage unit is started by using a signal indicating start of temperature increase that is transmitted from not-shown each sensor and ECU (hereinafter, also referred to as a temperature increase start signal) as a trigger signal, in accordance with a control structure which will be described later. Temperature increase control here is carried out by selecting an optimal control mode from among a plurality of control modes that have been set in advance, in accordance with a type of the temperature increase start signal.

Specifically, when converter ECU 30 receives the temperature increase start signal, converter ECU 30 generates a temperature increase instruction for the power storage unit of which temperature is lower than the corresponding temperature lower limit value, based on the type of the received temperature increase start signal. Then, converter ECU 30 generates switching instructions PWC1, PWC2 and controls converters 18, 28 in accordance with the generated temperature increase instruction such that electric power is supplied and received between the power storage unit corresponding to the temperature increase instruction and the remaining power storage unit or between the power storage unit corresponding to the temperature increase instruction and the commercial power supply outside the vehicle.

Here, converter ECU 30 has in advance a plurality of control modes different from each other in a charge/discharge current of the power storage unit, energy efficiency of the power supply system and a component to/from which electric power is to be supplied and received, and selects an optimal control mode from among the plurality of control modes in accordance with the generated temperature increase instruction, that is, in accordance with the type of the temperature increase start signal. Then, converter ECU 30 generates switching instructions PWC1, PWC2 such that supply and reception of electric power described above is performed in the selected control mode.

It is noted that the charge/discharge current of the power storage unit corresponds to a charge/discharge current of the power storage unit corresponding to the temperature increase instruction, and a rate of change in the power storage unit temperature (that is, a temperature increase rate) becomes higher with the increase in the charge/discharge current. In addition, energy efficiency of the power supply system is lowered with the increase in electric power loss caused in a supply/reception path (such as electric power loss caused in the converter) in supply and reception of electric power between power storage units or between the power storage unit and the commercial power supply. Moreover, the component to/from which electric power is to be supplied and received refers to a component to/from which electric power is supplied/received from/to the power storage unit of which temperature is to be raised, and in the present embodiment, it refers to the remaining power storage unit or the commercial power supply outside the vehicle.

In the present embodiment, the drive force generation unit corresponds to the "load device", main positive bus MPL and main negative bus MNL correspond to the "power line", and converters 18, 28 correspond to the "plurality of voltage conversion units." In addition, converter ECU 30 implements the "mode selection means" and the "temperature increase control means."

Figure 2:
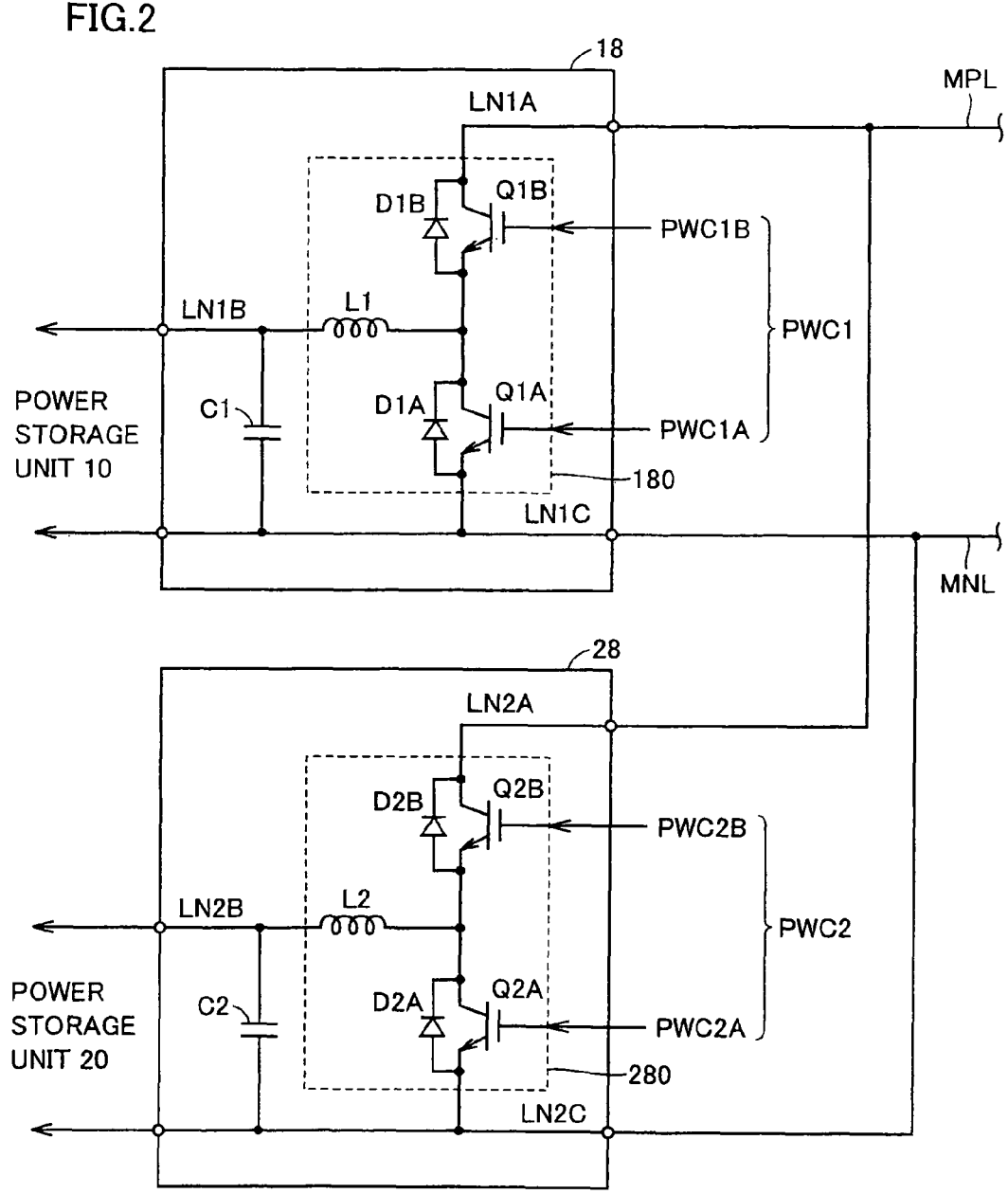
FIG. 2 is a schematic configuration diagram of a converter according to the embodiment of the present invention.

FIG. 2 is a schematic configuration diagram of converters 18, 28 according to the embodiment of the present invention.

Referring to FIG. 2, converter 18 is constituted of a chopper circuit 180 and a smoothing capacitor C1.

Chopper circuit 180, during discharge, boosts the DC electric power received from power storage unit 10 in response to switching instruction PWC1 from converter ECU 30, while chopper circuit 180, during charging, down converts the DC electric power received through main positive bus MPL and main negative bus MNL. In addition, chopper circuit 180 includes a positive bus LN1A, a negative bus LN1C, a line LN1B, transistors Q1A, Q1B representing a switching element, diodes D1A, D1B, and an inductor L1.

Positive bus LN1A has one end connected to a collector of transistor Q1B and the other end connected to main positive bus MPL. In addition, negative bus LN1C has one end connected to a negative side of power storage unit 10 and the other end connected to main negative bus MNL.

Transistors Q1A, Q1B are connected in series between negative bus LN1C and positive bus LN1A. Transistor Q1A has an emitter connected to negative bus LN1C and transistor Q1B has the collector connected to positive bus LN1A. In addition, diodes D1A, D1B allowing current flow from the emitter side to the collector side are connected between the collector and the emitter of transistors Q1A, Q1B respectively. Further, inductor L1 is connected to a connection point of transistor Q1A and transistor Q1B.

Line LN1B has one end connected to the positive side of power storage unit 10 and the other end connected to inductor L1.

Smoothing capacitor C1 is connected between line LN1B and negative bus LN1C, and reduces the AC component contained in the DC voltage across line LN1B and negative bus LN1C.

The voltage conversion operation (boost operation and down-converting operation) of converter 18 will be described hereinafter.

In the boost operation, converter ECU 30 maintains transistor Q1B in the ON state, and turns on/off transistor Q1A at a prescribed duty ratio. During the ON period of transistor Q1A, a discharge current flows from power storage unit 10 to main positive bus MPL sequentially through line LN1B, inductor L1, diode D1B, and positive bus LN1A. At the same time, a pump current flows from power storage unit 10 sequentially through line LN1B, inductor L1, transistor Q1A, and negative bus LN1C. Inductor L1 accumulates electromagnetic energy by means of the pump current. Successively, when transistor Q1A makes transition from the ON state to the OFF state, inductor L1 superimposes the accumulated electromagnetic energy onto the discharge current. Consequently, the average voltage of the DC electric power supplied from converter 18 to main positive bus MPL and main negative bus MNL is boosted by a voltage corresponding to the electromagnetic energy accumulated in inductor L1 in accordance with the duty ratio.

On the other hand, in the down-converting operation, converter ECU 30 turns on/off transistor Q1B at a prescribed duty ratio, and maintains transistor Q1A in the OFF state. During the ON period of transistor Q1B, the charge current flows from main positive bus MPL to power storage unit 10 sequentially through positive bus LN1A, transistor Q1B, inductor L1, and line LN1B. Successively, when transistor Q1B makes transition from the ON state to the OFF state, magnetic flux is generated to prevent current variation in inductor L1. Accordingly, the charge current continues to flow sequentially through diode D1A, inductor L1 and line LN1B. Meanwhile, from a viewpoint of electric energy, it is solely during the ON period of transistor Q1B that the DC electric power is supplied through main positive bus MPL and main negative bus MNL. Therefore, if the charge current is maintained constant (if inductance of inductor L1 is sufficiently large), the average voltage of the DC electric power supplied from converter 18 to power storage unit 10 is set to a value obtained by multiplying the DC voltage across main positive bus MPL and main negative bus MNL by the duty ratio.

In order to control such a voltage conversion operation of converter 18, converter ECU 30 generates switching instruction PWC1 consisting of a switching instruction PWC1A controlling on/off of transistor Q1A and a switching instruction PWC1B controlling on/off of transistor Q1B.

As the configuration and the operation of converter 28 are also similar to those of converter 18 described above, detailed description will not be repeated.

(Control Structure of Converter ECU)

The control configuration of converter ECU 30 will be described hereinafter in further detail.

Figure 3:
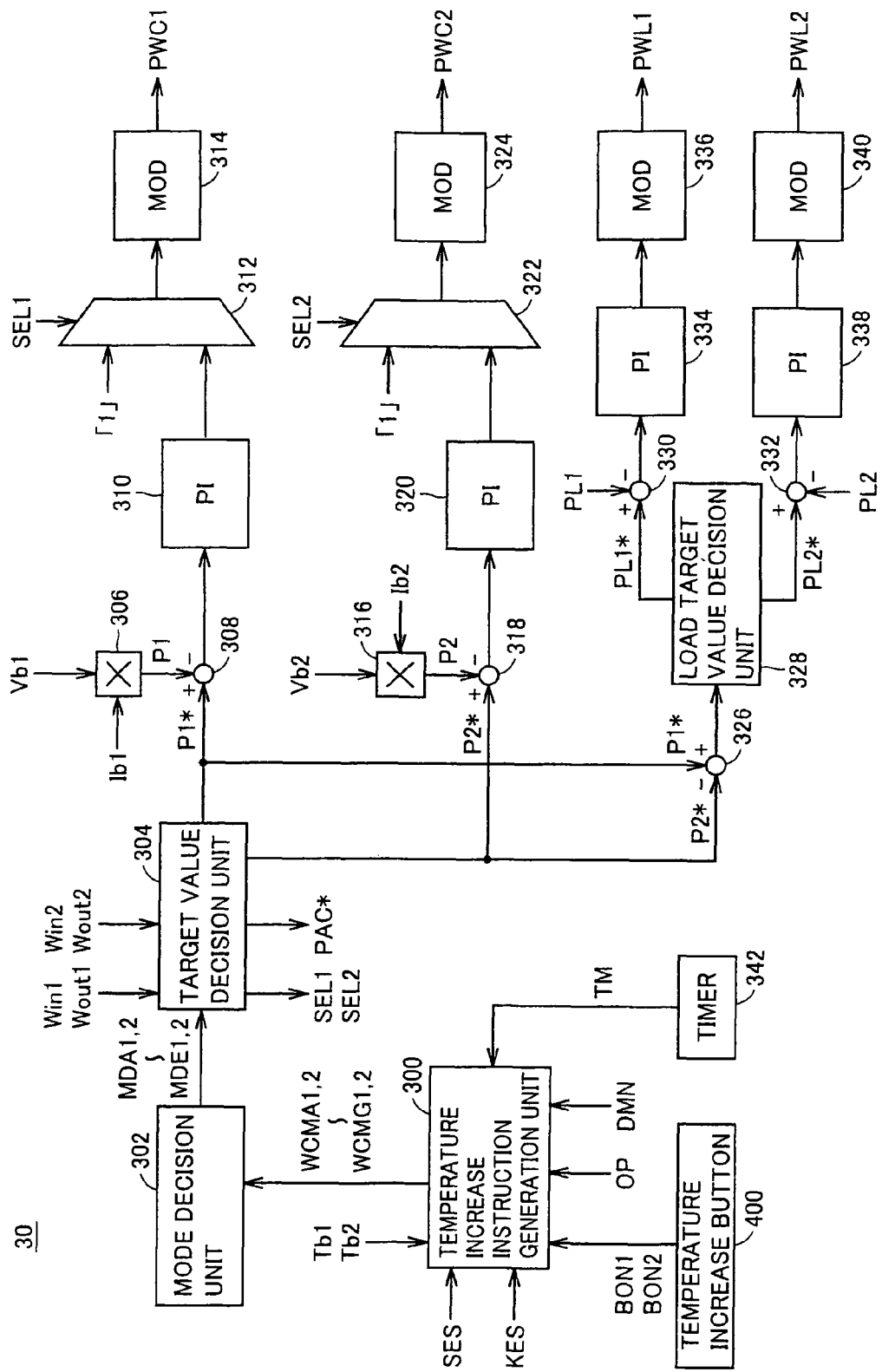
FIG. 3 is a block diagram showing a control structure for implementing generation of a switching instruction in a converter ECU.

FIG. 3 is a block diagram showing a control structure for implementing generation of a switching instruction in converter ECU 30.

Referring to FIG. 3, converter ECU 30 includes a temperature increase instruction generation unit 300, a mode decision unit 302, a target value decision unit 304, subtraction units 308, 318, 326, 330, and 332, proportional control units (PI) 310, 320, 334, and 338, multiplication units 306 and 316, a load target value decision unit 328, selection units 312 and 322, modulation units (MOD) 314, 324, 336, and 340, and a timer 342.

When temperature increase instruction generation unit 300 receives the temperature increase start signal transmitted from each sensor and ECU and power storage unit temperatures Tb1, Tb2 from temperature detection units 12, 22, temperature increase instruction generation unit 300 generates any one of temperature increase instructions WCMA1 to WCMG1 and WCMA2 to WCMG2 using the temperature increase start signal as the trigger signal, and outputs the generated temperature increase instruction to mode decision unit 302.

Specifically, temperature increase instruction generation unit 300 determines whether temperature increase control of power storage units 10, 20 should be carried out or not, in response to reception of the temperature increase start signal transmitted from each sensor or ECU. More specifically, temperature increase instruction generation unit 300 determines whether each of power storage unit temperatures Tb1, Tb2 is lower than the corresponding temperature lower limit value or not.

When it is determined that the temperature of any of power storage units 10, 20 is lower than the corresponding temperature lower limit value, temperature increase instruction generation unit 300 generates the temperature increase instruction for the power storage unit of which temperature is lower than the corresponding temperature lower limit value, based on the type of the temperature increase start signal.

As will be described later, the temperature increase start signal input to temperature increase instruction generation unit 300 includes signals SDU, KDU indicating that a door of the vehicle has been unlocked with a wireless door lock mechanism equipped in the vehicle, signals BON1, BON2 indicating a state of operation of a temperature increase button 400 provided in the vicinity of a driver's seat in the vehicle, signal OP indicating that charge connector 60 has been opened, a signal DMN indicating a temperature increase request from a not-shown house, an output signal TM from timer 342, and the like.

In the present embodiment, temperature increase instructions WCMA1 to WCMG1 correspond to the temperature increase instruction for power storage unit 10, while temperature increase instructions WCMA2 to WCMG2 correspond to the temperature increase instruction for power storage unit 20. In the description below, temperature increase instructions WCMA1 to WCMG1 and WCMA2 to WCMG2 are also collectively simply referred to as temperature increase instructions WCMA to WCMG.

If both of power storage unit temperatures Tb1, Tb2 are lower than the corresponding temperature lower limit value, temperature increase instruction generation unit 300 generates the temperature increase instruction for the power storage unit higher in priority out of power storage units 10, 20. Here, priority is decided in accordance with a full charge capacity of the power storage unit, SOC of the power storage unit, and an amount of deviation of the power storage unit temperature from a prescribed operation temperature range.

Mode decision unit 302 decides the control mode for converters 18, 28 based on temperature increase instructions WCMA to WCMG received from temperature increase instruction generation unit 300. Specifically, mode decision unit 302 has set in advance a plurality of control modes MDA1 to MDE1 and MDA2 to MDE2 different from each other in the charge/discharge current (temperature increase rate) of the power storage unit, energy efficiency of the power supply system, and a component to/from which electric power is to be supplied and received, selects an optimal control mode from among the plurality of control modes in accordance with a temperature increase instruction WCM, and sets that control mode as the control mode for converters 18, 28. In the description below, control modes MDA1 to MDE1 and MDA2 to MDE2 are also collectively simply referred to as control modes MDA to MDE.

FIG. 4 is a diagram for illustrating temperature increase instructions WCMA to WCMG generated based on the temperature increase start signal and control modes MDA to MDE decided based on generated temperature increase instructions WCMA to WCMG.

Referring to FIG. 4, in the present embodiment, it is assumed that the temperature increase start signal includes seven types in total. The temperature increase instruction is classified into seven types in total in correspondence with the temperature increase start signal.

Initially, a smart door unlock signal SDU and a keyless door unlock signal KDU are set as the first and second temperature increase start signals respectively. These signals are signals transmitted from a body ECU (not shown) controlling lock/unlock of the door to converter ECU 30 as the signal indicating unlock of the door when the door of the vehicle is unlocked as a result of matching between an ID code included in a signal transmitted from a wireless transmitter contained in the key and an ID code provided to the vehicle, in the vehicle provided with a wireless door lock mechanism.

Specifically, smart door unlock signal SDU is adapted to what is called a smart entry system, which is a function to allow lock/unlock of the door of the vehicle or start of the engine without using a mechanical key and represents one form of the wireless door lock mechanism. More specifically, when the smart door unlock function included in the smart entry system (for example, a function to unlock the door when the user carrying the smart key holds a handle outside the driver's seat in a sensing area outside the vehicle) is actuated, the body ECU generates smart door unlock signal SDU and transmits the signal to converter ECU 30.

In addition, keyless door unlock signal KDU is adapted to a keyless entry system representing another form of the wireless door lock mechanism. More specifically, the body ECU generates keyless door unlock signal KDU and transmits the signal to converter ECU 30 in response to unlock of the door as a result of actuation of the wireless remote control function contained in the key.

Converter ECU 30 generates temperature increase instruction WCMA (WCMA1 or WCMA2) for the power storage unit of which temperature is lower than the corresponding temperature lower limit value and outputs the instruction to mode decision unit 302, in response to reception of smart door unlock signal SDU by temperature increase instruction generation unit 300.

Alternatively, temperature increase instruction generation unit 300 generates temperature increase instruction WCMB (WCMB1 or WCMB2) for the power storage unit of which temperature is lower than the corresponding temperature lower limit value and outputs the instruction to mode decision unit 302, in response to reception of keyless door unlock signal KDU.

Next, signal BON1 indicating that temperature increase button 400 has been set to ON as a result of manual operation by the user is set as the third temperature increase start signal. Temperature increase button 400 is provided in the vicinity of the driver's seat in the vehicle, and it is set to ON as a result of the user's manual operation or remote operation through the remote controller. Then, temperature increase button 400 transmits the temperature increase request from the user to converter ECU 30 in response to setting to ON.

Receiving signal BON1 indicating that temperature increase button 400 has been set to ON as a result of user's manual operation, temperature increase instruction generation unit 300 generates temperature increase instruction WCMC (WCMC1 or WCMC2) for the power storage unit of which temperature is lower than the corresponding temperature lower limit value and outputs the instruction to mode decision unit 302.

Next, signal OP indicating that charge connector 60 has been opened (hereinafter also referred to as the charge connector opening signal) is set as the fourth temperature increase start signal. For example, charge connector opening signal OP is generated in response to removal of charge connector 60 from a power outlet provided on the house side by the user before the user uses the vehicle. Generated charge connector opening signal OP is transmitted from opening and closing detection unit 62 provided in charge connector 60 to temperature increase instruction generation unit 300.

Temperature increase instruction generation unit 300 generates temperature increase instruction WCMD (WCMD1 or WCMD2) for the power storage unit of which temperature is lower than the corresponding temperature lower limit value and outputs the instruction to mode decision unit 302, in response to reception of charge connector opening signal OP.

In addition, signal BON2 indicating that temperature increase button 400 described above has been set to ON as a result of a remote operation through the remote controller by the user is set as the fifth temperature increase start signal. Receiving signal BON2 indicating that temperature increase button 400 has been set to ON as a result of the remote operation, temperature increase instruction generation unit 300 generates temperature increase instruction WCME (WCME1 or WCME2) for the power storage unit of which temperature is lower than the corresponding temperature lower limit value and outputs the instruction to mode decision unit 302.

Next, temperature increase request signal DMN issued from the user in the house to the vehicle is set as the sixth temperature increase start signal. For example, temperature increase request signal DMN is issued when starting capability of the vehicle in an environment at a low temperature is desirably ensured by warming the power storage unit in advance before the user uses the vehicle in a cold region or the like.

Temperature increase instruction generation unit 300 generates temperature increase instruction WCMF (WCMF1 or WCMF2) for the power storage unit of which temperature is lower than the corresponding temperature lower limit value and outputs the instruction to mode decision unit 302, in response to reception of temperature increase request signal DMN.

Finally, output signal TM from timer 342 is set as the seventh temperature increase start signal. When a prescribed time set in advance by the user comes, timer 342 provides output signal TM as a notification to temperature increase instruction generation unit 300. For example, timer 342 is set by the user to a prescribed time before use of the vehicle in the next morning. Then, when the prescribed time comes, timer 342 outputs notification (output signal TM) to temperature increase instruction generation unit 300.

Receiving notification from timer 342 before start of the vehicle, temperature increase instruction generation unit 300 generates temperature increase instruction WCMG (WCMG1 or WCMG2) for the power storage unit of which temperature is lower than the corresponding temperature lower limit value and outputs the instruction to mode decision unit 302 in order to warm the power storage unit in advance.

As described above, temperature increase instructions WCMA to WCMG are generated in accordance with the type of the temperature increase start signal and output to mode decision unit 302. Then, mode decision unit 302 decides the control mode for converters 18, 28 based on temperature increase instructions WCMA to WCMG.

Specifically, as shown in FIG. 4, five modes of a "rate-oriented mode," a "semi-rate-oriented mode," an "efficiency-oriented mode," an "external charge mode," and a "time management mode" are set in advance as the control modes for the converter.

Initially, a rate-oriented mode MDA is a control mode placing importance on improvement in the temperature increase rate of the power storage unit. Rate-oriented mode MDA is suitable for an example where the temperature of the power storage unit is desirably raised quickly within a limited period of time before start of the vehicle.

In the present embodiment, in response to generation of temperature increase instructions WCMA, WCMB and WCMC, the control mode for the converter is set to rate-oriented mode MDA. This is for ensuring starting capability of the vehicle by rapidly raising the temperature of the power storage unit, because when the user unlocks the door of the vehicle or when the user manually operates the temperature increase button to ON, it is normally expected with high probability that the vehicle is started soon.

Next, a semi-rate-oriented mode MDB is a mode following the rate-oriented mode described above and it is applied when electric power is supplied and received between the power storage units. Semi-rate-oriented mode MDB aims to suppress consumption of stored electric power in the entire power supply system by setting discharge electric power of one power storage unit to be equal to charge electric power of the other power storage unit while ensuring rapid temperature increase of the power storage unit, when it is determined that there is some time before start of the vehicle.

In the present embodiment, the control mode for the converter is set to semi-rate-oriented mode MDB in response to generation of temperature increase instruction WCMD. This is based on the fact that, when charge connector 60 is opened, it is expected that start of the vehicle will follow, however, it is determined that there is some time before the timing of start of the vehicle as compared with door unlock or manual operation of temperature increase button 400 described above. Therefore, in this case, the sum of SOC (=SOC1+SOC2) of power storage units 10, 20 can be maintained constant by controlling converters 18, 28 such that balance of supply and reception of electric power between the power storage units attains to substantially zero.

In addition, an efficiency-oriented mode MDC is a control mode placing importance on improvement in energy efficiency of the power supply system. As described above, energy efficiency of the power supply system becomes lower with the increase in electric power loss caused in an electric power supply/reception path between the power storage units and between the power storage unit and the commercial power supply. Therefore, efficiency-oriented mode MDC is suitable for an example where overall efficiency of the power supply system during temperature increase control is desirably improved.

In the present embodiment, the control mode for the converter is set to efficiency-oriented mode MDC in response to generation of temperature increase instruction WCME. This is based on the fact that, when temperature increase button 400 is set to ON through remote operation, it is determined that there is further time before the timing of start of the vehicle as compared with opening of charge connector 60 described above. Therefore, in such a case, electric power loss is positively reduced so that overall efficiency of the power supply system can be improved.

Moreover, an external charge mode MDD is a mode applied to an example where electric power is supplied and received between the power storage unit and the commercial power supply outside the vehicle.

In the present embodiment, the control mode for the converter is set to external charge mode MDD in response to generation of temperature increase instruction WCMF. This is for raising the temperature of the power storage unit without using stored electric power in the power supply system, by supplying and receiving electric power between the commercial power supply and the power storage unit when the user in the house issues the temperature increase request.

Finally, a time management mode MDE is a mode where supply and reception of electric power between the power storage units or between the power storage unit and the commercial power supply is managed such that the temperature of the power storage unit is equal to or higher than the corresponding temperature lower limit value at a prescribed time that has been set in advance.

In the present embodiment, the control mode for the converter is set to time management mode MDD in response to generation of temperature increase instruction WCMG. This is for ensuring starting capability of the vehicle in an environment at a low temperature by starting temperature increase control of the power storage unit at a prescribed time before the user uses the vehicle as described above.

Referring again to FIG. 3, when mode decision unit 302 decides control modes MDA to MDE for the converter based on the relation in FIG. 4, mode decision unit 302 outputs decided control modes MDA to MDE to target value decision unit 304. In FIG. 3, control modes MDA1 to MDE1 indicate the control mode decided based on temperature increase instructions WCMA1 to WCMG1 for power storage unit 10, while control modes MDA2 to MDE2 indicate control modes decided based on temperature increase instructions WCMA2 to WCMG2 for power storage unit 20.

Target value decision unit 304 receives control modes MDA to MDE from mode decision unit 302 and receives allowable electric power (charge allowable electric power Win1, Win2 and discharge allowable electric power Wout1, Wout2) of power storage units 10, 20 from not-shown battery ECU 32. Then, target value decision unit 304 decides target charge/discharge electric power P1*, P2* in power storage units 10, 20 based on the allowable electric power, in accordance with each decided control mode.

In addition, target value decision unit 304 decides target supply electric power PAC* for the commercial power supply (not shown) based on decided target charge/discharge electric power P1*, P2*.

Moreover, target value decision unit 304 outputs selection instructions SEL1, SEL2 to selection units 312, 322 in accordance with each decided control mode.

Target charge/discharge electric power P1*, P2* thus decided by target value decision unit 304 is output to subtraction units 308, 318, and 326. In addition, target supply electric power PAC* is output to drive ECU 50 (FIG. 1).

Subtraction unit 308 operates power deviation between target charge/discharge electric power P1* and charge/discharge electric power P1 (actual value) of power storage unit 10, and outputs the result to proportional control unit (PI) 310. Charge/discharge electric power P1 of power storage unit 10 is calculated by multiplication by multiplication unit 306 of charge/discharge voltage value Vb1 from charge/discharge voltage detection unit 14 by charge/discharge current value Ib1 from charge/discharge current detection unit 16.

Proportional control unit (PI) 310 is configured to include at least a proportional element (P) and an integral element (I), and generates a duty instruction Ton1A in accordance with the input power deviation. Duty instruction Ton1A is a control instruction defining on-duty of transistor Q1A (FIG. 2) of converter 18.

Receiving duty instruction Ton1A and value "1", selection unit 312 selects any one of them based on selection instruction SEL1 from target value decision unit 304, and outputs the selected one as a duty instruction Ton1A* to modulation unit 314. It is noted that the value "1" is used for maintaining duty instruction Ton1A* at "1", that is, maintaining transistor Q1A of converter 18 in the ON state. Maintaining transistor Q1A of converter 18 in the ON state is comparable to setting a voltage conversion ratio of converter 18 (a ratio between an input voltage and an output voltage) to 1.

Modulation unit (MOD) 314 compares a carrier wave generated by a not-shown oscillation unit with duty instruction Ton1A*, generates switching instruction PWC1A, and controls converter 18.

Subtraction unit 318 operates power deviation between target charge/discharge electric power P2* and charge/discharge electric power P2 (actual value) of power storage unit 20, and outputs the result to proportional control unit (PI) 320. Charge/discharge electric power P2 of power storage unit 20 is calculated by multiplication by multiplication unit 316 of charge/discharge voltage value Vb2 from charge/discharge voltage detection unit 24 by charge/discharge current value Ib2 from charge/discharge current detection unit 26.

Proportional control unit (PI) 320 is configured to include at least a proportional element and an integral element, and generates a duty instruction Ton2A in accordance with the input power deviation. Duty instruction Ton2A is a control instruction defining on-duty of transistor Q2A (FIG. 2) of converter 28.

Receiving duty instruction Ton2A and value "1", selection unit 322 selects any one of them based on selection instruction SEL2 from target value decision unit 304, and outputs the selected one as a duty instruction Ton2A* to modulation unit (MOD) 324. It is noted that the value "1" is used for maintaining duty instruction Ton2A* at "1", that is, maintaining transistor Q2A of converter 28 in the ON state. Maintaining transistor Q2A of converter 28 in the ON state is comparable to setting a voltage conversion ratio of converter 28 (a ratio between an input voltage and an output voltage) to 1.

Modulation unit (MOD) 324 compares a carrier wave generated by a not-shown oscillation unit with duty instruction Ton2A*, generates switching instruction PWC2, and controls converter 28.

Subtraction unit 326 operates power deviation between target charge/discharge electric power P1* of power storage unit 10 and target charge/discharge electric power P2* of power storage unit 20, and outputs the result to load target value decision unit 328. Load target value decision unit 328 decides target supply electric power PL1* for air-conditioner apparatus 70 and target supply electric power PL2* for low-voltage auxiliaries 82 in accordance with magnitude of the power deviation, with a method which will be described later. Then, decided target supply electric powers PL1*, PL2* are output to subtraction units 330, 332 respectively.

Subtraction unit 330 operates power deviation between target supply electric power PL1* and supply electric power PL1 (actual value), and outputs the result to proportional control unit (PI) 334. It is noted that a not-shown multiplication unit calculates supply electric power PL1 by multiplying charge/discharge voltage value Vb1 from charge/discharge voltage detection unit 14 by supply current value IL1 from supply current detection unit 76.

Proportional control unit (PI) 334 is configured to include at least a proportional element and an integral element, and generates a duty instruction in accordance with the input power deviation. The duty instruction is a control instruction defining on-duty of a transistor (not shown) implementing inverter 72 (FIG. 1) contained in air-conditioner apparatus 70.

Modulation unit (MOD) 336 compares a carrier wave generated by a not-shown oscillation unit with the duty instruction, and generates switching instruction PWC1 for controlling inverter 72.

Subtraction unit 332 operates power deviation between target supply electric power PL2* and supply electric power PL2 (actual value), and outputs the result to proportional control unit (PI) 338. It is noted that a not-shown multiplication unit calculates supply electric power PL2 by multiplying charge/discharge voltage value Vb1 from charge/discharge voltage detection unit 14 by supply current value IL2 from supply current detection unit 78.

Proportional control unit (PI) 338 is configured to include at least a proportional element and an integral element, and generates a duty instruction in accordance with the input power deviation. The duty instruction is a control instruction defining on-duty of a transistor implementing buck converter 80 (FIG. 1).

Modulation unit (MOD) 340 compares a carrier wave generated by a not-shown oscillation unit with the duty instruction, and generates switching instruction PWC2 for controlling buck converter 80.

Though converter ECU 30 may be configured to include a circuit corresponding to each block, in many cases, the functions in the block diagram shown in FIG. 3 are implemented by execution by converter ECU 30 of a processing routine in accordance with a program set in advance.

(Supply and Reception of Electric Power in Each Control Mode)

Supply and reception of electric power in each control mode will be described hereinafter. Here, target value decision unit 304 in FIG. 3 decides target charge/discharge electric power P1*, P2* and target supply electric power PAC* and outputs selection instructions SEL1, SEL2 to selection units 312, 322, in accordance with each decided mode, in line with supply and reception of electric power shown below.

In addition, in the description below, an example where power storage unit temperature Tb1 of power storage unit 10 is lower than the temperature lower limit value and the temperature of power storage unit 10 is to be raised will be described.

(1) Supply and Reception of Electric Power in Rate-Oriented Mode

Figure 5A:
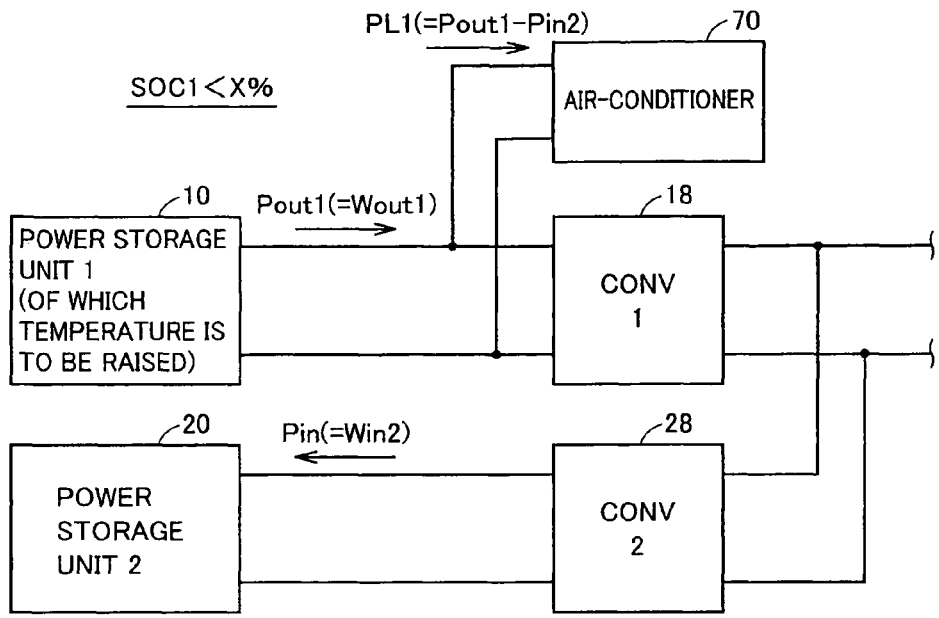
FIGS. 5A and 5B are diagrams for illustrating supply and reception of electric power when the converter operates in a rate-oriented mode.
Figure 5B:
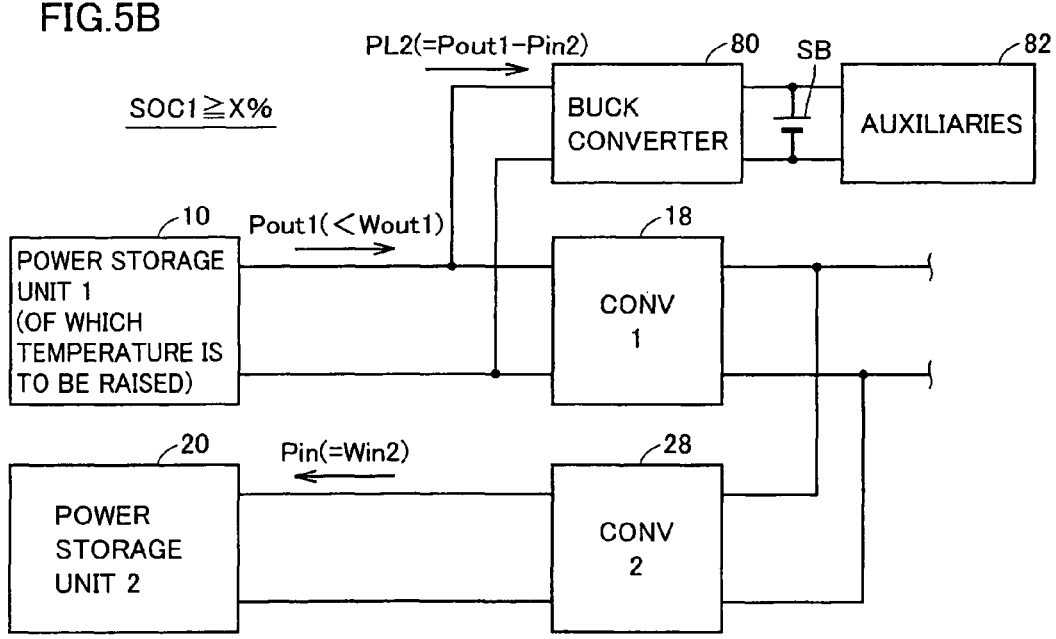

FIGS. 5A and 5B are diagrams for illustrating supply and reception of electric power when the converter operates in the rate-oriented mode. Supply and reception of electric power in this example is performed between power storage unit 10 of which temperature is to be raised and remaining power storage unit 20, because the timing is immediately before start of the vehicle and electrical connection between the power supply system and the commercial power supply outside the vehicle has been cut off.

FIG. 5A is a diagram for illustrating supply and reception of electric power when SOC1 of power storage unit 10 is lower than a prescribed threshold value x %.

FIG. 5B is a diagram for illustrating supply and reception of electric power when SOC1 of power storage unit 10 is equal to or greater than the prescribed threshold value x %.

As will be described below, supply and reception of electric power is performed, with different electric power allotment being set in accordance with SOC1 of power storage unit 10. This is for reducing electric power loss caused by an internal resistance of power storage unit 10, by relatively lowering the temperature increase rate, that is, by relatively lowering charge/discharge current Ib1, because it is determined that there is some margin in charge/discharge performance of power storage unit 10 when SOC1 of power storage unit 10 is equal to or greater than a threshold value.

Referring to FIG. 5A, when SOC1 of power storage unit 10 is lower than prescribed threshold value x % (for example, 50%), converter 18 is controlled such that discharge electric power Pout1 of power storage unit 10 is set to discharge allowable electric power Wout1. Here, power storage unit 10 discharges electric power equal to discharge allowable electric power Wout1, so that charge/discharge current Ib1 of power storage unit 10 increases to an allowable current feed level. Consequently, the temperature increase rate of power storage unit 10 can be increased.

On the other hand, converter 28 is controlled such that power storage unit 20 can accept discharge electric power Pout1 of power storage unit 10. Specifically, converter 28 is controlled such that charge electric power Pin2 of power storage unit 20 is set to prescribed electric power not exceeding charge allowable electric power Win2.

In addition, when discharge electric power Pout1 of power storage unit 10 is greater than charge electric power Pin2 of power storage unit 20, the auxiliary machinery load is controlled such that surplus electric power obtained by subtracting charge electric power Pin2 from discharge electric power Pout1 (Pout1−Pin2) is set as the supply electric power for the auxiliary machinery load. For example, when the surplus electric power is relatively great, as shown in FIG. 5A, inverter 72 (FIG. 1) in air-conditioner apparatus 70 is controlled such that the surplus electric power is set as supply electric power PL1 for air-conditioner apparatus 70.

It is noted that allotment of surplus electric power between air-conditioner apparatus 70 and low-voltage auxiliaries 82 is decided by load target value decision unit 328 (FIG. 3) in accordance with magnitude of the surplus electric power.

Thus, when SOC1 of power storage unit 10 of which temperature is to be raised is lower than prescribed threshold value x %, the temperature increase rate of power storage unit 10 can be increased by maximizing charge/discharge current Ib1 of power storage unit 10.

On the other hand, when SOC1 of power storage unit 10 of which temperature is to be raised is equal to or greater than prescribed threshold value x %, charge/discharge current Ib1 of power storage unit 10 is increased within a range not causing considerable voltage lowering in charge/discharge voltage Vb1, so that the temperature increase rate can be increased while suppressing electric power loss in power storage unit 10.

Specifically, referring to FIG. 5B, when SOC1 of power storage unit 10 is equal to or greater than prescribed threshold value x %, converter 18 is controlled such that discharge electric power Pout1 of power storage unit 10 is set to prescribed electric power lower than discharge allowable electric power Wout1. It is noted that the prescribed electric power is decided based on an internal resistance value of power storage unit 10 in accordance with current power storage unit temperature Tb1, such that electric power loss corresponding to charge/discharge current Ib1 is not greater than a prescribed value.

In addition, converter 28 is controlled such that power storage unit 20 can accept discharge electric power Pout1 of power storage unit 10. Specifically, converter 28 is controlled such that charge electric power Pin2 of power storage unit 20 is set to prescribed electric power not exceeding charge allowable electric power Win2.

In addition, when discharge electric power Pout1 of power storage unit 10 is greater than charge electric power Pin2 of power storage unit 20, the auxiliary machinery load is controlled such that surplus electric power obtained by subtracting charge electric power Pin2 from discharge electric power Pout1 (Pout1−Pin2) is set as the supply electric power for the auxiliary machinery load. For example, when the surplus electric power is relatively small, as shown in FIG. 5B, buck converter 80 is controlled such that the surplus electric power is set as supply electric power PL2 for low-voltage auxiliaries 82.

(2) Supply and Reception of Electric Power in Semi-Rate-Oriented Mode

FIG. 6 is a diagram for illustrating supply and reception of electric power when the converter operates in the semi-rate-oriented mode. Supply and reception of electric power in this example is performed between power storage unit 10 of which temperature is to be raised and remaining power storage unit 20, because charge connector 60 (FIG. 1) has been opened and electrical connection between the power supply system and the commercial power supply outside the vehicle has been cut off.

Referring to FIG. 6, converter 18 is controlled such that discharge electric power Pout1 of power storage unit 10 is set to charge allowable electric power Win2 of power storage unit 20. In addition, converter 28 is controlled such that charge electric power Pin2 of power storage unit 20 is set to charge allowable electric power Win2 of power storage unit 20.

Namely, in the semi-rate-oriented mode, converters 18, 28 are controlled such that discharge electric power Pout1 of power storage unit 10 is substantially equal to charge electric power Pin2 of power storage unit 20. Therefore, as the surplus electric power caused in supply and reception of electric power between the power storage units is substantially zero, supply electric power PL1, PL2 for the auxiliary machinery load (air-conditioner apparatus 70 and low-voltage auxiliaries 82) is controlled to substantially zero. Consequently, as electric power is not taken out of power supply system 100, SOC of the overall power supply system (=SOC1+SOC2) can be maintained constant.

(3) Supply and Reception of Electric Power in Efficiency-Oriented Mode

FIG. 7 is a diagram for illustrating supply and reception of electric power when the converter operates in the efficiency-oriented mode. Supply and reception of electric power in this example is performed between power storage unit 10 of which temperature is to be raised and remaining power storage unit 20, because the timing is before start of the vehicle and electrical connection between the power supply system and the commercial power supply outside the vehicle has been cut off.

Referring to FIG. 7, converters 18, 28 are controlled such that discharge electric power Pout1 of power storage unit 10 is substantially equal to charge electric power Pin2 of power storage unit 20, as in the semi-rate-oriented mode described in (2) above.

On the other hand, in the efficiency-oriented mode, in order to further reduce electric power loss (switching loss) in converter 28 corresponding to remaining power storage unit 20, on-duty of transistor Q2A of converter 28 is maintained at 1, that is, transistor Q2A of converter 28 is maintained in the ON state.

Specifically, in converter ECU 30 in FIG. 3, target value decision unit 304 outputs selection instruction SEL2 to selection unit 322 in accordance with the fact that the control mode indicated by mode decision unit 302 is the efficiency-oriented mode. Receiving selection instruction SEL2, selection unit 322 selects the value "1" and outputs the value as duty instruction Ton2A* to modulation unit (MOD) 314. Modulation unit (MOD) 314 generates switching instruction PWC2 and controls converter 28 based on duty instruction Ton2A* (="1").

By thus maintaining transistor Q2A of converter 28 corresponding to remaining power storage unit 20 in the ON state, switching loss caused in converter 28 can be suppressed. On the other hand, as control response in the voltage conversion operation of converter 28 is lowered, power deviation between target charge/discharge electric power P2* and charge/discharge electric power P2 may be caused in power storage unit 20. Therefore, in the efficiency-oriented mode, target charge/discharge electric power P2* is decided such that charge electric power Pin2 of power storage unit 20 is set to electric power slightly lower than charge allowable electric power Win2. Then, target charge/discharge electric power P1* of power storage unit 10 is decided such that it is substantially equal to target charge/discharge electric power P2* of power storage unit 20.

(4) Supply and Reception of Electric Power in External Charge Mode

Figure 8:
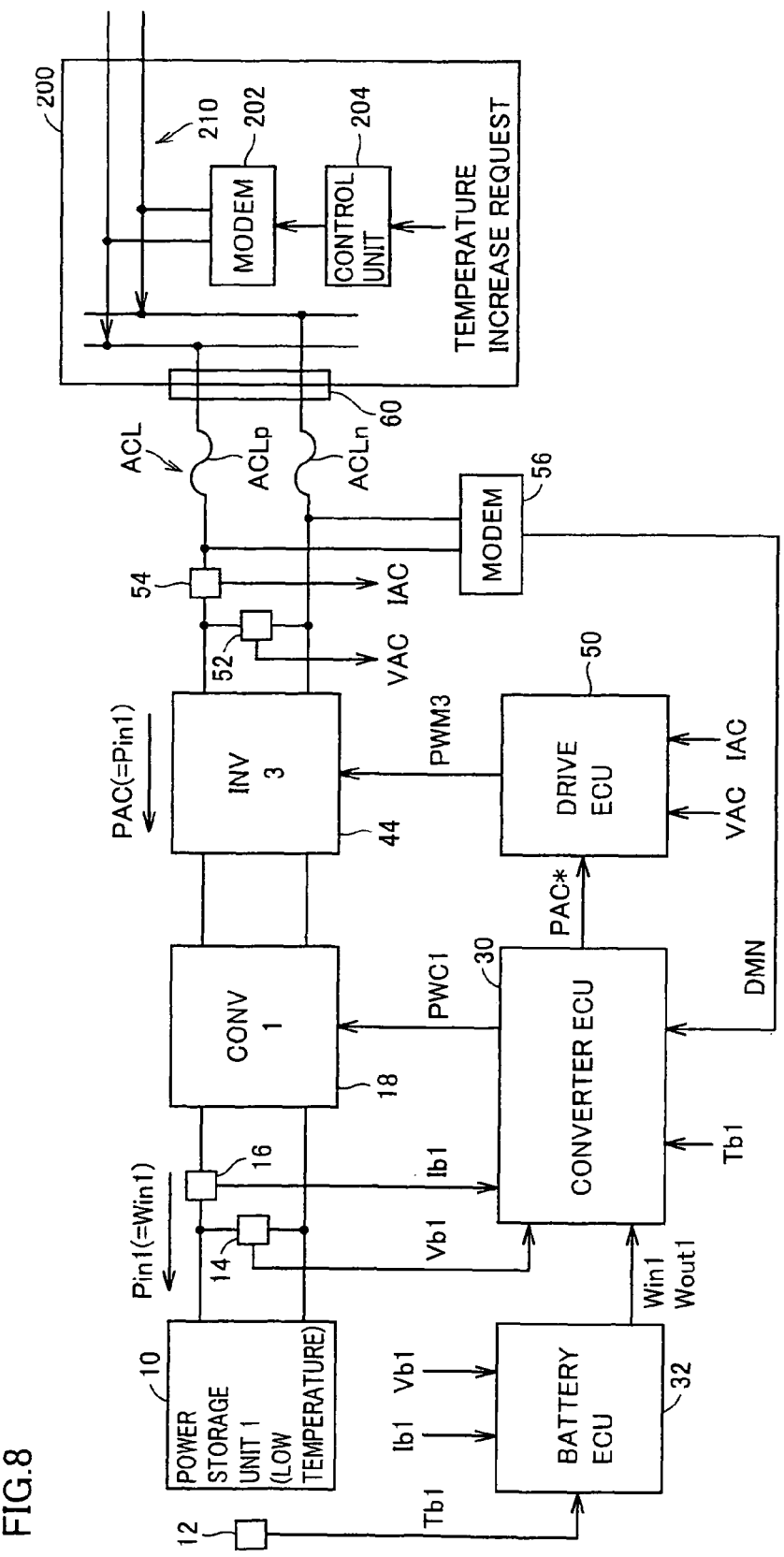
FIG. 8 is a block diagram for illustrating supply and reception of electric power when the converter operates in an external charge mode.

FIG. 8 is a block diagram for illustrating supply and reception of electric power when the converter operates in the external charge mode.

Referring to FIG. 8, in the external charge mode, the vehicle is connected to the power outlet of a house 200 through supply line ACL by charge connector 60. Then, the vehicle is provided with the commercial power supply supplied to house 200 through a commercial power supply line 210. Here, power storage unit 10 of which temperature is to be raised is charged with the commercial power supply provided from house 200. The temperature of power storage unit 10 is thus raised through self-heating.

Specifically, by coupling charge connector 60 and the power outlet of house 200 to each other, supply line ACL and commercial power supply line 210 are electrically connected to each other. House 200 includes a modem 202 and a control unit 204.

Modem 202 transmits and receives information to and from the electrically connected vehicle. Modem 202 is connected between commercial power supply lines 210, modulates an information signal provided from control unit 204, and superimposes the information signal on a current that flows through commercial power supply line 210, while modem 202 extracts a modulated signal included in the current that flows through commercial power supply line 210, demodulates the modulated signal to the information signal, and outputs the information signal to control unit 204.

Control unit 204 is configured to be able to manage a charged state of the power storage unit in the vehicle by transmitting and receiving information to and from the vehicle, and to accept the temperature increase request from the user or the like. Then, when the temperature increase request is provided, control unit 204 transmits temperature increase request signal DMN to the vehicle through modem 202.

In the vehicle, a modem 56 is connected between positive supply line ACLp and negative supply line ACLn to enable transmission and reception of information to and from house 200. Receiving temperature increase request signal DMN transmitted from house 200 through modem 56, converter ECU 30 generates switching instruction PWC1 for converter 18 corresponding to power storage unit 10 of which temperature is to be raised. In addition, converter ECU 30 decides target supply electric power PAC* for the commercial power supply and outputs the target supply electric power to drive ECU 50.

Drive ECU 50 generates a switching instruction PWM3 for inverter 44 based on provided target supply electric power PAC*. Thus, supply and reception of electric power between power storage unit 10 of which temperature is to be raised and the commercial power supply is started.

Here, converter ECU 30 controls converter 18 such that charge electric power Pin1 of power storage unit 10 is set to charge allowable electric power Win1. Specifically, when target value decision unit 304 (FIG. 3) sets target charge/discharge electric power P1* to charge allowable electric power Win1, switching instruction PWC1 for converter 18 is generated based on power deviation between set target charge/discharge electric power P1* and charge/discharge electric power P1 of power storage unit 10.

In addition, target value decision unit 304 sets charge allowable electric power Win1 of power storage unit 10 to target supply electric power PAC* for the commercial power supply and outputs the same to drive ECU 50. Drive ECU 50 generates switching instruction PWM3 for inverter 44 based on power deviation between provided target supply electric power PAC* and the actual value of supply electric power PAC. It is noted that the actual value of supply electric power PAC is calculated by multiplying supply current IAC from supply current detection unit 54 by supply voltage VAC from supply voltage detection unit 52.

[Variation]

According to the power supply system of the embodiment of the present invention described above, the configuration for supplying electric power from the commercial power supply to power storage unit 10 of which temperature is to be raised by using inverter 44 arranged separately from inverters 40, 42 for driving motor-generators MG1, MG2 has been described.

On the other hand, in the present variation, a configuration in which inverters 40, 42 are used to drive motor generators MG1, MG2 as well as to carry out temperature increase control of the power storage unit without providing inverter 44 will be described.

Figure 9:
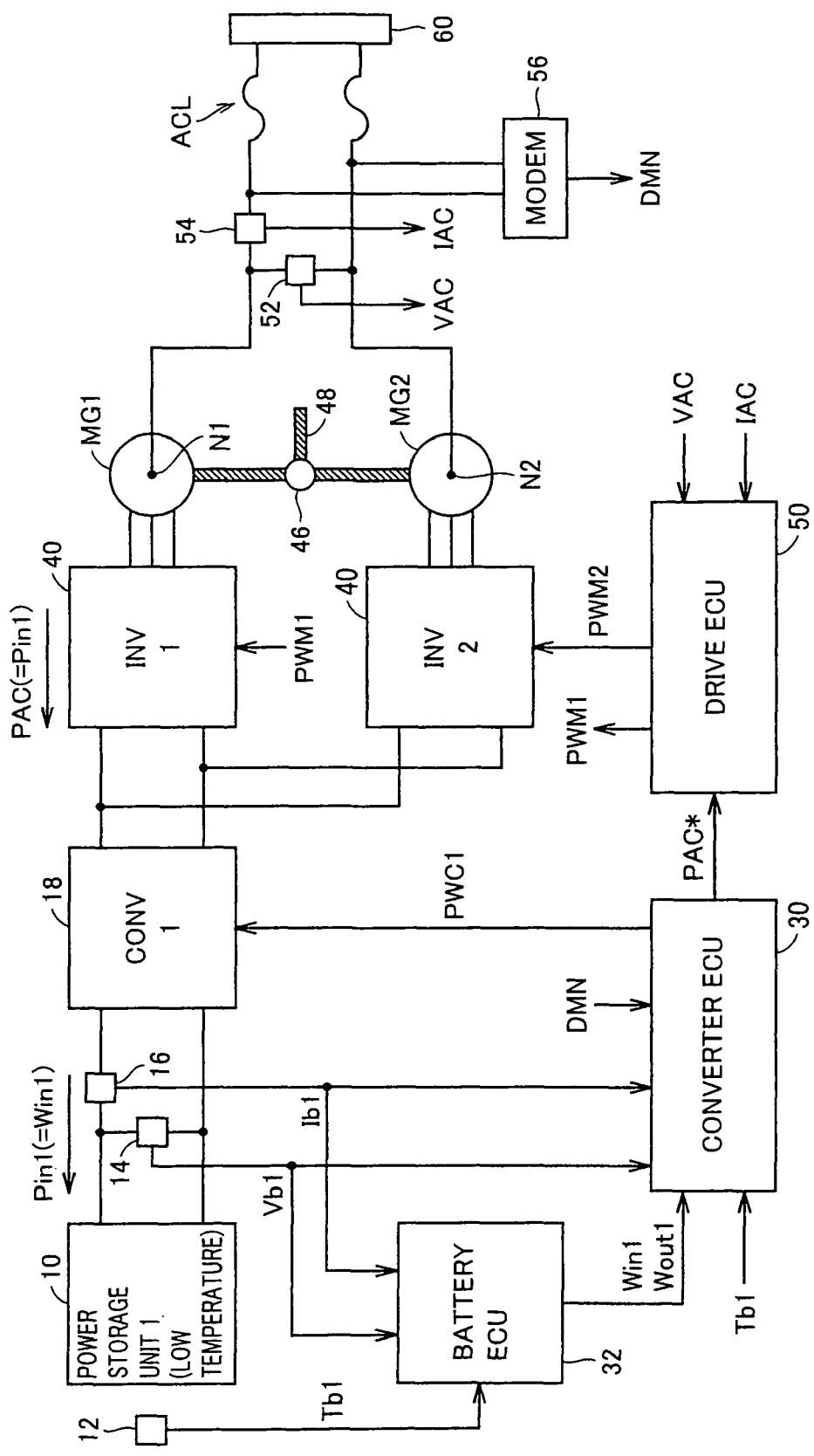
FIG. 9 is a schematic configuration diagram of a vehicle according to a variation of the embodiment of the present invention.

FIG. 9 is a schematic configuration diagram of a vehicle according to the variation of the embodiment of the present invention.

Referring to FIG. 9, the vehicle according to the present variation is obtained by eliminating inverter 44 and changing connection of positive supply line ACLp and negative supply line ACLn to connection thereof to a neutral point N1 of motor-generator MG1 and a neutral point N2 of motor-generator MG2 respectively in FIG. 1. As the configuration in the variation is otherwise common to that in FIG. 1, illustration and description thereof in connection with FIG. 9 are not provided.

As described above, motor-generators MG1, MG2 are three-phase AC rotating electric machines including a rotor having permanent magnets embedded. In addition, in the present variation, motor-generators MG1, MG2 include a stator of which coils of three phases are Y-connected (star-connected). In this Y-connection, the point at which respective coils are connected to one another corresponds to neutral points N1, N2 of motor-generators MG1, MG2.

As described above, inverters 40, 42 are constituted of a bridge circuit including switching elements of three phases. Namely, each of inverters 40, 42 includes three switching elements in an upper arm (positive side) and three switching elements in a lower arm (negative side). In generating three-phase AC electric power from inverters 40, 42, one of the switching elements on the upper arm side and one of the switching elements on the lower arm side are switched over time, for drive to the ON state.

On the other hand, in each of the upper arm side and the lower arm side, three switching elements may together perform an ON/OFF operation. In such an operation mode, three switching elements in the upper arm can be considered to be in the same switching state (all ON or all OFF) and three switching elements on the lower arm side can also be considered to be in the same switching state.

In such an operation mode, as phase voltages are equal to one another, a zero voltage vector with the neutral point serving as the reference can be defined.

Figure 10:
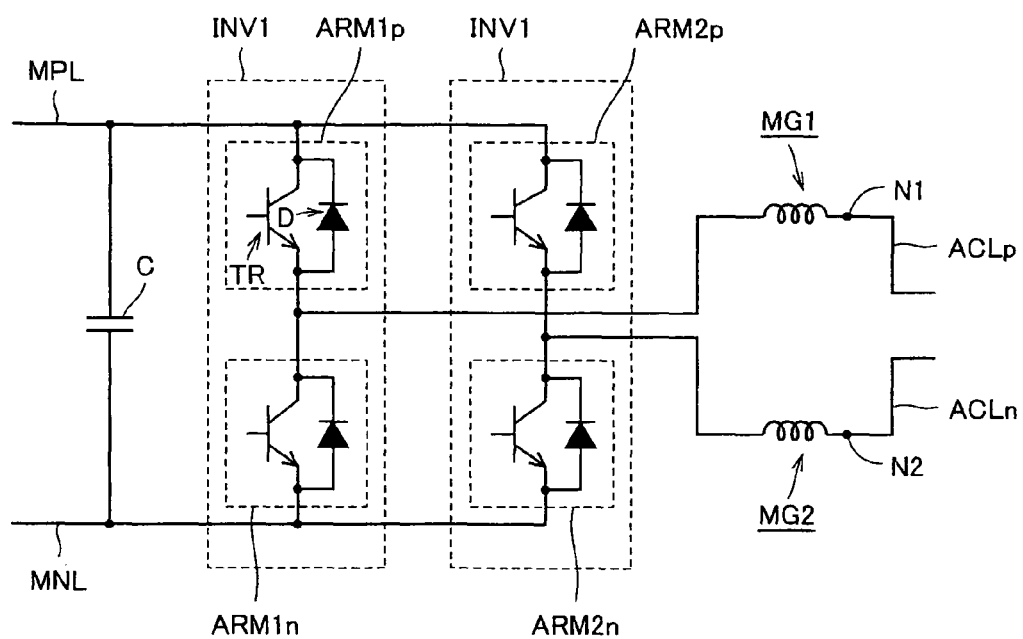
FIG. 10 shows a zero-phase equivalent circuit of an inverter and a motor-generator when a zero-voltage vector is generated.

FIG. 10 shows a zero-phase equivalent circuit of inverters 40, 42 and motor-generators MG1, MG2 when a zero-voltage vector is generated.

Referring to FIG. 10, when inverters 40, 42 perform such an operation mode as generating the zero voltage vector as described above, three switching elements TR on the upper arm side in inverter 40 are collectively shown as an upper arm ARM1$p$, while three switching elements TR on the lower arm side in inverter 40 are collectively shown as a lower arm ARM1$n$. Similarly, three switching elements TR on the upper arm side in inverter 42 are collectively shown as an upper arm ARM2$p$, while three switching elements TR on the lower arm side in inverter 42 are collectively shown as a lower arm ARM2$n$.

The zero-phase equivalent circuit shown in FIG. 10 can be considered as a single-phase PWM inverter receiving AC commercial power provided to neutral points N1, N2 through positive supply line ACLp and negative supply line ACLn as the input. Here, each of inverters 40, 42 is subjected to switching control such that the zero voltage vector is varied over time and inverters 40, 42 operate as the arm of each phase of the single-phase PWM inverter. Then, the AC commercial power is converted to DC electric power, which in turn can be supplied to the power storage unit of which temperature is to be raised.

According to the present variation, in addition to the effect in the embodiment of the present invention described above, the configuration of the vehicle can be simplified. Therefore, the power supply system according to the present invention can be configured with low cost.

(5) Supply and Reception of Electric Power in Time Management Mode

Supply and reception of electric power in the time management mode is performed with any of two methods shown below, depending on a state of the vehicle.

First, when the vehicle is connected to a power supply connector of house 200 through the supply line by the charge connector, converter ECU 30 performs supply and reception of electric power between power storage unit 10 of which temperature is lower than the corresponding temperature lower limit value and the commercial power supply, in accordance with output signal TM provided from timer 342 at the prescribed time set in advance.

Secondly, when the vehicle is not connected to the power supply connector of house 200, converter ECU 30 performs supply and reception of electric power between power storage unit 10 of which temperature is lower than the corresponding temperature lower limit value and remaining power storage unit 20.

In each of these two methods, converter ECU 30 sets a rate of increase in charge/discharge current Ib1 of power storage unit 10 based on a target value of a temperature increase time period set in advance (corresponding to the time period from the prescribed time to the time of use of the vehicle by the user). Then, converter ECU 30 controls the converter and/or inverter 44 such that charge/discharge current Ib1 varies at the rate of increase that has been set.

Though the example in which the temperature of power storage unit 10 is to be raised has been illustrated in (1) to (5) above, similar supply and reception of electric power is performed also when the temperature of power storage unit 20 is to be raised.

(Control Flow)

FIGS. 11 to 14 are flowcharts for implementing temperature increase control in converter ECU 30.

Figure 11:
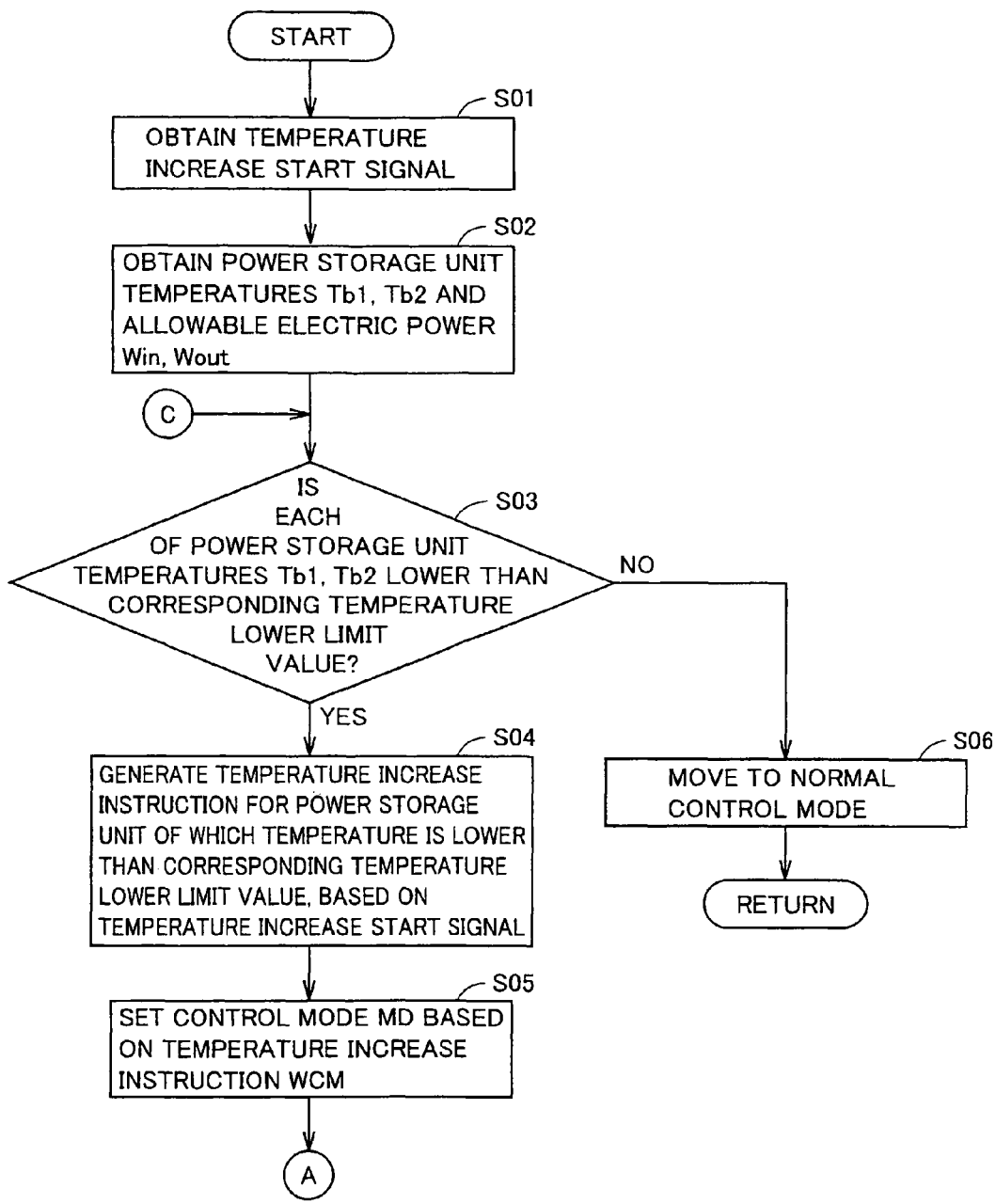
FIG. 11 is a flowchart for implementing temperature increase control in the converter ECU.

Referring to FIG. 11, converter ECU 30 obtains the temperature increase start signal from each sensor and ECU provided in the vehicle (step S01). In addition, converter ECU 30 obtains allowable electric power (charge allowable electric power Win1, Win2 and discharge allowable electric power Wout1, Wout2) from battery ECU 32 and obtains power storage unit temperatures Tb1, Tb2 from temperature detection units 12, 22 (step S02).

Then, converter ECU 30 determines whether each of obtained power storage unit temperatures Tb1, Tb2 is lower than the corresponding temperature lower limit value or not (step S03).

If any of power storage unit temperatures Tb1, Tb2 is lower than the corresponding temperature lower limit value in step S03, converter ECU 30 generates temperature increase instruction WCM for the power storage unit of which temperature is lower than the corresponding temperature lower limit value, based on the temperature increase start signal (step S04). If both of power storage unit temperatures Tb1, Tb2 are lower than the corresponding temperature lower limit value, converter ECU 30 generates temperature increase instruction WCM (WCMA to WCMG) for the power storage unit higher in priority.

In addition, converter ECU 30 decides control mode MD (MDA to MDE) for the converter based on generated temperature increase instruction WCM (step S05). The control mode is decided in such a manner that converter ECU 30 extracts control mode MD corresponding to generated temperature increase instruction WCM from the map stored in advance as shown in FIG. 4.

On the other hand, if neither of power storage unit temperatures Tb1, Tb2 is lower than the corresponding temperature lower limit value in step S03, converter ECU 30 moves to a normal control mode (step S06). Then, converter ECU 30 returns to the initial processing.

The "normal control mode" herein refers to a control mode except for a temperature increase control mode and it is not limited to a specific control mode, however, for example, a configuration where switching instructions PWC1, PWC2 are generated to control converters 18, 28 such that an input/output voltage value of electric power supplied and received to and from the drive force generation unit attains to a prescribed voltage target value or the like is preferred.

Figure 12:
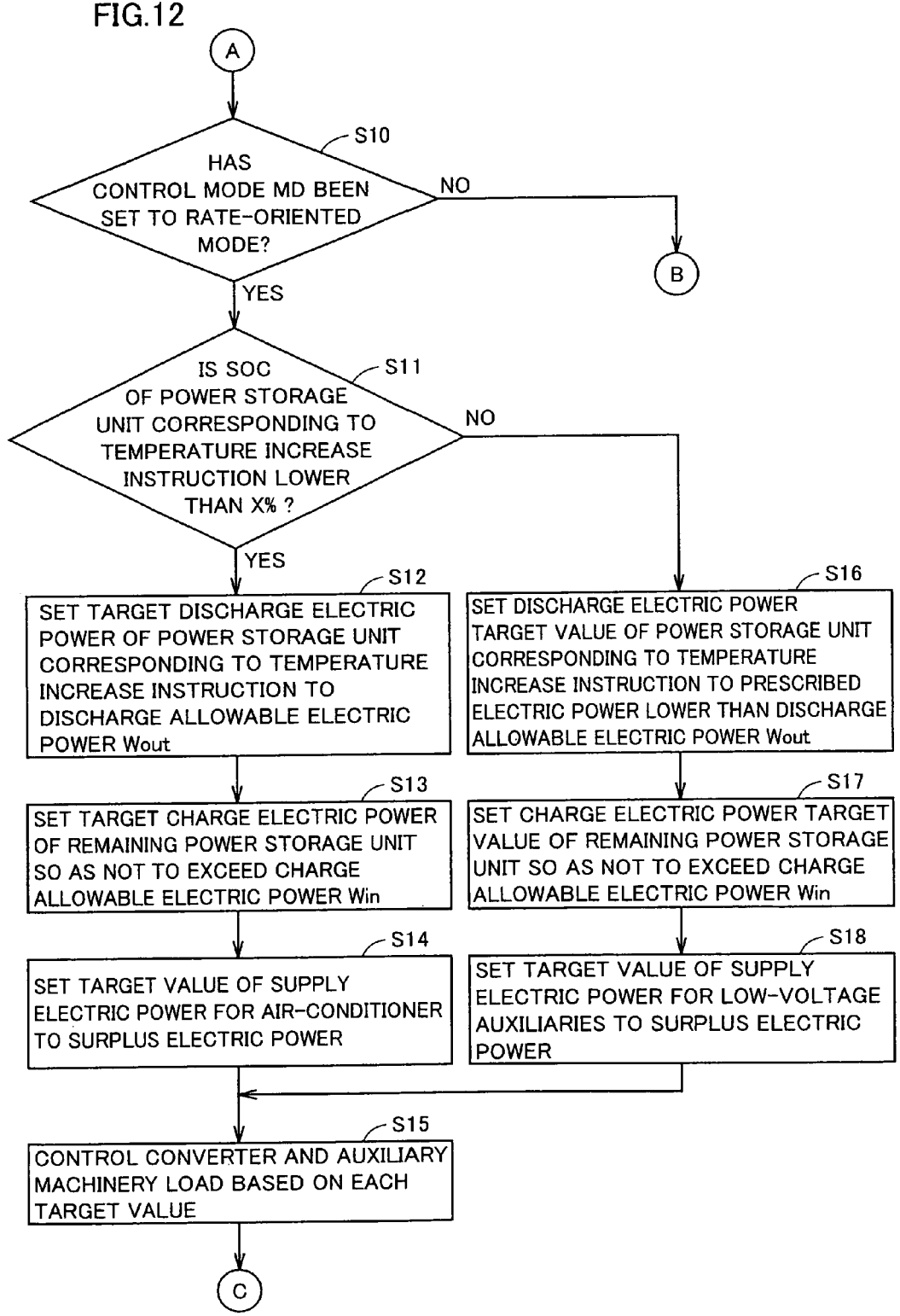
FIG. 12 is a flowchart for implementing temperature increase control in the converter ECU.

Referring to FIG. 12, converter ECU 30 determines whether control mode MD set in step S05 in FIG. 11 is rate-oriented mode MDA (MDA1 or MDA2) or not (step S10). If it is determined that control mode MD has been set to rate-oriented mode MDA, converter ECU 30 further determines whether SOC of the power storage unit corresponding to the temperature increase instruction is lower than prescribed threshold value x % or not (step S11).

Figure 13:
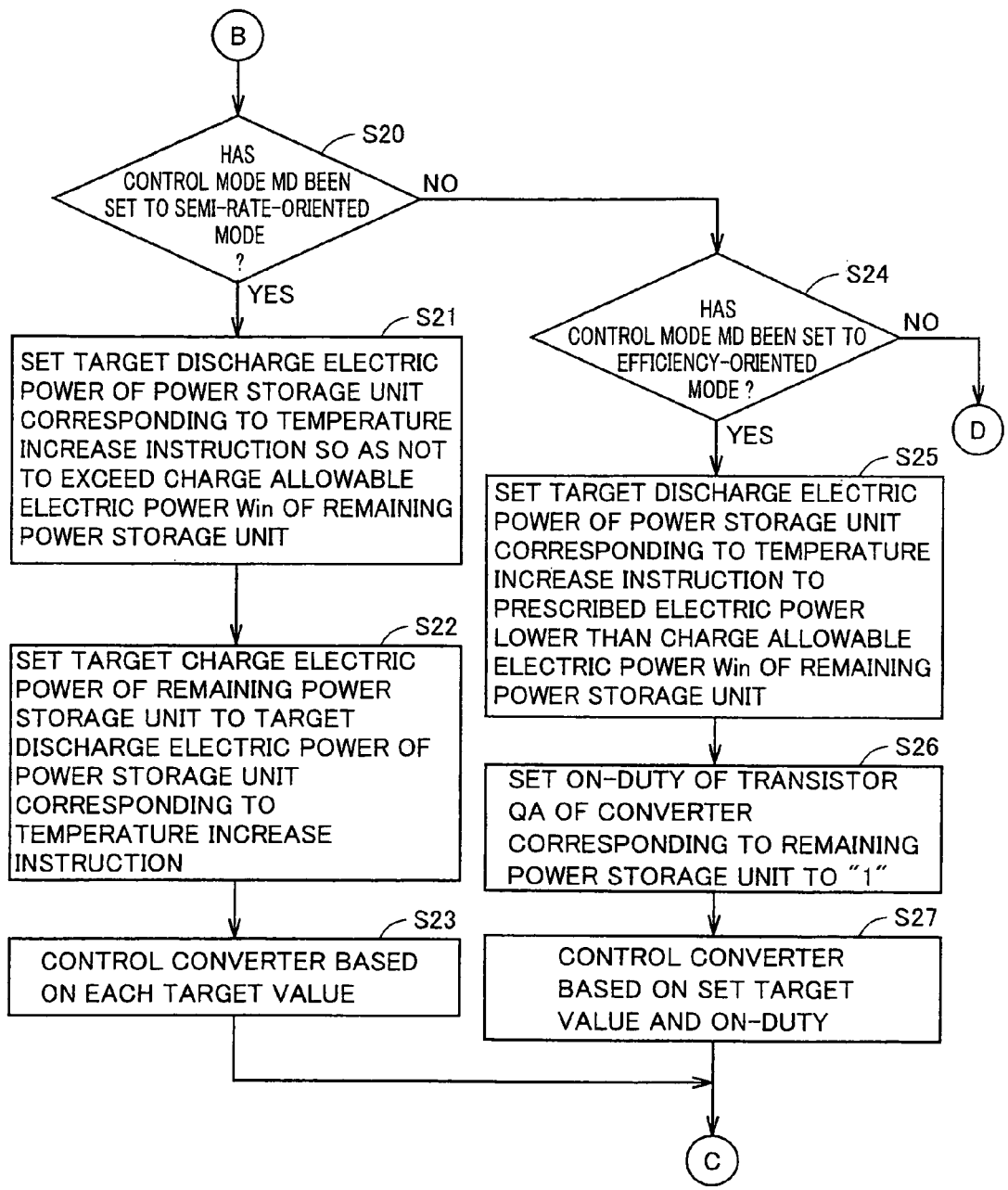
FIG. 13 is a flowchart for implementing temperature increase control in the converter ECU.

On the other hand, if it is determined in step S10 that control mode MD has not been set to rate-oriented mode MDA, converter ECU 30 moves the processing to step 20 in FIG. 13.

Returning again to step S11, if it is determined that SOC of the power storage unit corresponding to the temperature increase instruction is lower than prescribed threshold value x %, converter ECU 30 sets the target discharge electric power of the power storage unit corresponding to the temperature increase instruction to discharge allowable electric power Wout of that power storage unit (step S12).

Then, converter ECU 30 sets the target charge electric power of the remaining power storage unit so as not to exceed charge allowable electric power Win of that power storage unit, based on the target discharge electric power set in step S12 (step S13).

In addition, converter ECU 30 calculates surplus electric power by subtracting the target charge electric power set in step S13 from the target discharge electric power set in step S12, and decides the target supply electric power for the auxiliary machinery load (air-conditioner apparatus 70 and low-voltage auxiliaries 82) based on magnitude of the calculated surplus electric power (step S14).

Then, converter ECU 30 controls converters 18, 28 and controls the auxiliary machinery load in accordance with each target value set in steps S12 to S14 (step S15).

Thereafter, converter ECU 30 determines again whether each of power storage unit temperatures Tb1, Tb2 is lower than the corresponding temperature lower limit value (step S03 in FIG. 11). If it is determined that neither of power storage unit temperatures Tb1, Tb2 is lower than the corresponding temperature lower limit value, converter ECU 30 moves to the normal control mode (step S06 in FIG. 11). Then, converter ECU 30 returns to the initial processing.

Returning again to step S11, if it is determined that SOC of the power storage unit corresponding to the temperature increase instruction is not lower than prescribed threshold value x %, converter ECU 30 sets the target discharge electric power of the power storage unit corresponding to the temperature increase instruction to prescribed electric power lower than discharge allowable electric power Wout of that power storage unit (step S16).

Then, converter ECU 30 sets the target charge electric power of the remaining power storage unit so as not to exceed charge allowable electric power Win of that power storage unit, based on the target discharge electric power set in step S16 (step S17).

In addition, converter ECU 30 calculates surplus electric power by subtracting the target charge electric power set in step S17 from the target discharge electric power set in step S16, and decides the target supply electric power for the auxiliary machinery load based on magnitude of the calculated surplus electric power (step S18).

Then, converter ECU 30 controls converters 18, 28 and controls the auxiliary machinery load in accordance with each target value set in steps S16 to S18 (step S15).

Thereafter, converter ECU 30 determines again whether each of power storage unit temperatures Tb1, Tb2 is lower than the corresponding temperature lower limit value (step S03 in FIG. 11). If it is determined that neither of power storage unit temperatures Tb1, Tb2 is lower than the corresponding temperature lower limit value, converter ECU 30 moves to the normal control mode (step S06 in FIG. 11). Then, converter ECU 30 returns to the initial processing.

Referring to FIG. 13, if it is determined in step S10 in FIG. 12 that control mode MD has not been set to rate-oriented mode MDA, converter ECU 30 successively determines whether control mode MD has been set to semi-rate-oriented mode MDB (MDB1 or MDB2) or not (step S20). If it is determined that control mode MD has been set to semi-rate-oriented mode MDB, converter ECU 30 sets the target discharge electric power of the power storage unit corresponding to the temperature increase instruction within a range of discharge allowable electric power Wout2 of that power storage unit, so as not to exceed charge allowable electric power Win of the remaining power storage unit (step S21).

In addition, converter ECU 30 sets the target charge electric power of the remaining power storage unit to the target discharge electric power of the power storage unit corresponding to the temperature increase instruction set in step S21 (step S22). Then, converter ECU 30 controls converters 18, 28 in accordance with each target value set in steps S21 and S22 (step S23).

Returning again to step S20, if it is determined that control mode MD has not been set to semi-rate-oriented mode MDB, converter ECU 30 further determines whether control mode MD has been set to efficiency-oriented mode MDC (MDC1 or MDC2) or not (step S24).

If it is determined in step S24 that control mode MD has been set to efficiency-oriented mode MDC, converter ECU 30 sets the target discharge electric power of the power storage unit corresponding to the temperature increase instruction to electric power lower than charge allowable electric power Win of the remaining power storage unit (step S25).

In addition, converter ECU 30 sets on-duty of the transistor on the positive side of the converter corresponding to the remaining power storage unit to "1" (step S26).

Then, converter ECU 30 controls converters 18, 28 in accordance with the target discharge electric power set in step S24 and the on-duty set in step S25 (step S27).

After steps S23 and S27, converter ECU 30 determines again whether each of power storage unit temperatures Tb1, Tb2 is lower than the corresponding temperature lower limit value (step S03 in FIG. 11). If it is determined that neither of power storage unit temperatures Tb1, Tb2 is lower than the corresponding temperature lower limit value, converter ECU 30 moves to the normal control mode (step S06 in FIG. 11). Then, converter ECU 30 returns to the initial processing.

Figure 14:
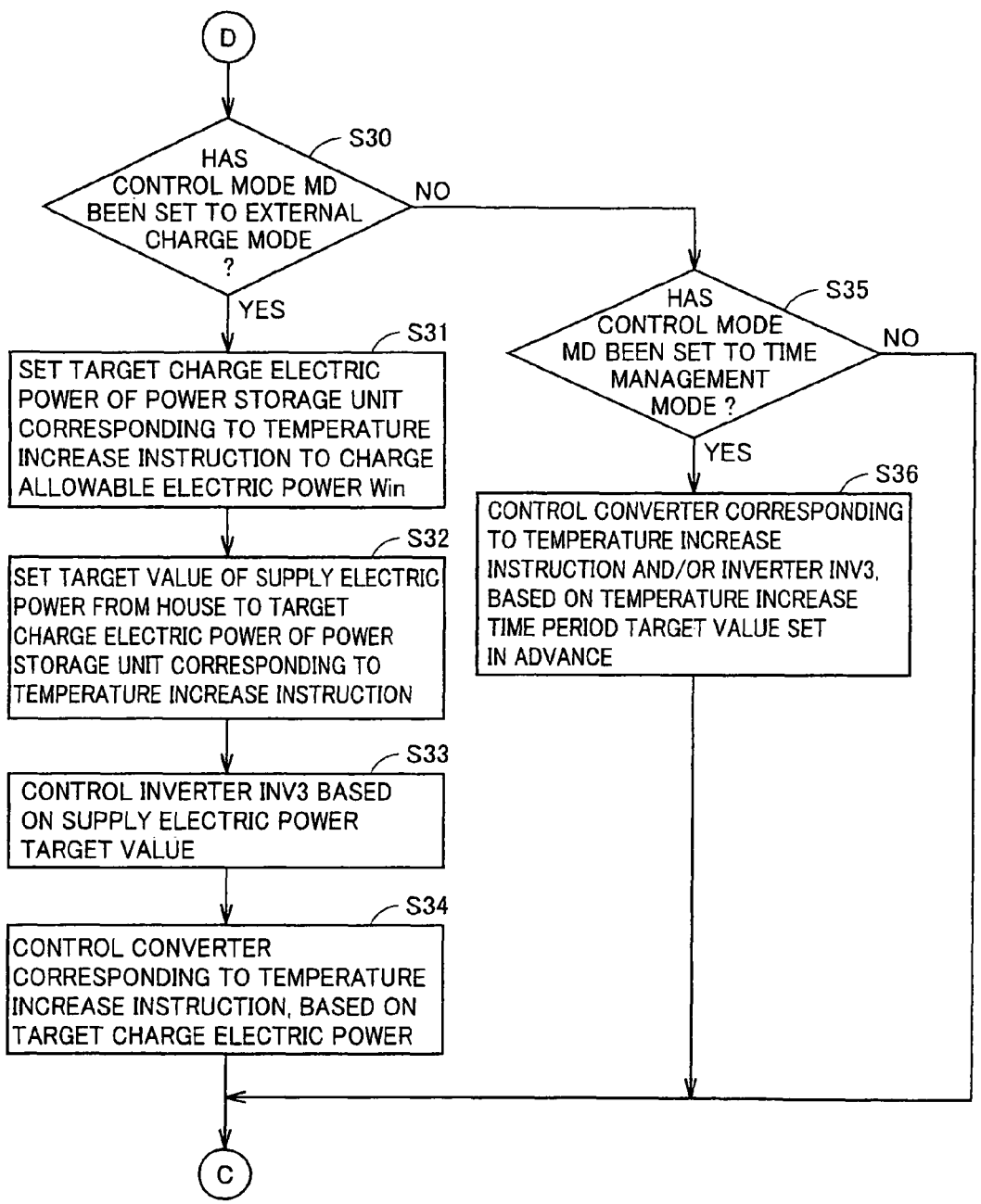
FIG. 14 is a flowchart for implementing temperature increase control in the converter ECU.

Returning again to step S24 in FIG. 13, if it is determined that control mode MD has not been set to efficiency-oriented mode MDC, converter ECU 30 further determines whether control mode MD has been set to external charge mode MDD (MDD1 or MDD2) or not (step S30 in FIG. 14).

If it is determined in step S30 that control mode MD has been set to external charge mode MDD, converter ECU 30 sets the target charge electric power of the power storage unit corresponding to the temperature increase instruction to charge allowable electric power Win of that power storage unit (step S31).

In addition, converter ECU 30 sets the target value of commercial electric power supplied from the house to the target charge electric power of the power storage unit corresponding to the temperature increase instruction set in step S31 and outputs the same to drive ECU 50 (step S32).

Drive ECU 50 generates switching instruction PWM3 for inverter 44 so as to control inverter 44, in accordance with the target value of the commercial electric power from converter ECU 30 (step 33).

Converter ECU 30 controls the converter corresponding to the temperature increase instruction, in accordance with the target charge electric power set in step S31 (step S34).

Returning again to step S30, if it is determined that control mode MD has not been set to the external charge mode, converter ECU 30 further determines whether control mode MD has been set to time management mode MDE (MDE1 or MDE2) or not (step S35).

Then, if it is determined in step S35 that control mode MD has been set to time management mode MDE, converter ECU 30 sets the rate of increase in charge/discharge current Ib1 of power storage unit 10, based on the target value of the temperature increase time period set in advance, in accordance with output signal TM from timer 342. Then, converter ECU 30 controls the converter and/or inverter 44 such that charge/discharge current Ib1 varies at that rate of increase that has been set.

After steps S34 and S36, converter ECU 30 determines again whether each of power storage unit temperatures Tb1, Tb2 is lower than the corresponding temperature lower limit value (step S03 in FIG. 11). If it is determined that neither of power storage unit temperatures Tb1, Tb2 is lower than the corresponding temperature lower limit value, converter ECU 30 moves to the normal control mode (step S06 in FIG. 11). Then, converter ECU 30 returns to the initial processing.

As described above, according to the embodiment of the present invention, control is carried out in accordance with the type of the temperature increase start signal such that a temperature increase rate of the power storage unit, energy efficiency, and a component to/from which electric power is to be supplied and received are optimized, and therefore, it is ensured that temperature increase control of the power storage unit will have been completed by the time of start of the vehicle while suppressing electric power loss. Consequently, improvement in energy efficiency in the power supply system and ensured starting capability of the vehicle can both be attained.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention can be utilized in a motor drive apparatus mounted on a hybrid car or an electric car.

The invention claimed is:

1. A power supply system supplying electric power to a load device mounted on a vehicle, comprising:
a power storage mechanism configured to be charged; and
a control device that is configured to carry out temperature increase control of said power storage mechanism in response to a temperature increase start instruction indicating start of temperature increase for said power storage mechanism,
said temperature increase start instruction including a plurality of types of temperature increase start signals different from each other in a signal source, and
said control device including
a mode selection unit that is configured to select one control mode from among a plurality of control modes set in advance, in accordance with a type of said temperature increase start signal, and
a temperature increase control unit that is configured to carry out temperature increase control of said power storage mechanism in accordance with said control mode selected by said mode selection unit, wherein
said power storage mechanism includes a plurality of power storage units each configured to be charged,
said power supply system further comprises
a power line configured to be capable of supplying and receiving electric power between said load device and said power supply system, and
a plurality of voltage conversion units provided between said plurality of power storage units and said power line, respectively, and each being configured to perform a voltage conversion operation between corresponding said power storage unit and said power line, and said temperature increase control unit includes
a power storage unit temperature determination unit that is configured to determine whether each of temperatures of said plurality of power storage units is lower than a corresponding lower limit value of said temperature, and
a voltage conversion control unit that is configured to control said voltage conversion operation of said plurality of voltage conversion units such that a temperature of said power storage unit of which temperature has been determined as being lower than said temperature lower limit value is raised and electric power is supplied and received between said power storage unit, of which temperature is to be raised, and remaining said power storage unit or outside of said vehicle, in accordance with said control mode selected by said mode selection unit.

2. The power supply system according to claim 1, wherein
said plurality of types of temperature increase start signals are categorized in accordance with an estimated value of a time period from transmission from said signal source until start of said vehicle, and
said mode selection unit is configured to select from among said plurality of control modes a first control mode in which a charge/discharge current of said power storage unit, of which temperature has been determined as being lower than said temperature lower limit value, becomes relatively large, in accordance with said temperature increase start signal corresponding to a relatively small estimated value of the time period until start of said vehicle.

3. The power supply system according to claim 2, wherein
said voltage conversion control unit is configured to control, when said mode selection unit selects said first control mode and said power storage unit, of which temperature is to be raised, is in a low-charge state, said voltage conversion operation of said voltage conversion unit corresponding to that power storage unit such that a target value of charge/discharge electric power of said power storage unit, of which temperature is to be raised, is set to charge/discharge allowable electric power of that power storage unit and charge/discharge electric power of said power storage unit, of which temperature is to be raised, attains to said target value.

4. The power supply system according to claim 2, wherein
said voltage conversion control unit is configured to control, when said mode selection unit selects said first control mode and said power storage unit, of which temperature is to be raised, is in a non-low-charge state, said voltage conversion operation of said voltage conversion unit corresponding to that power storage unit such that a target value of charge/discharge electric power of said power storage unit, of which temperature is to be raised, is set lower than charge/discharge allowable electric power of that power storage unit and electric power loss in that power storage unit is equal to or smaller than a prescribed value as well as charge/discharge electric power of said power storage unit, of which temperature is to be raised, attains to said target value.

5. The power supply system according to claim 2, wherein
said vehicle includes an auxiliary machinery load actuated upon receiving electric power from said power supply system, and
said voltage conversion control unit is configured to supply to said auxiliary machinery load, surplus electric power caused in supply and reception of electric power between said power storage unit, of which temperature is to be raised, and remaining said power storage unit.

6. The power supply system according to claim 2, wherein
said plurality of types of temperature increase start signals include a first temperature increase start signal transmitted in response to unlock of said vehicle as a result of actuation of a smart door unlock function mounted on said vehicle, and
said first temperature increase start signal corresponds to the relatively small estimated value of the time period until start of said vehicle.

7. The power supply system according to claim 2, wherein
said plurality of types of temperature increase start signals include a second temperature increase start signal transmitted in response to unlock of said vehicle as a result of actuation of a wireless remote control function mounted on said vehicle, and said second temperature increase start signal corresponds to the relatively small estimated value of the time period until start of said vehicle.

8. The power supply system according to claim 2, further comprising an operation unit provided inside said vehicle, said operation unit is configured to output a temperature increase request in response to an operation by a user, wherein
said plurality of types of temperature increase start signals include a third temperature increase start signal transmitted in response to output of said temperature increase request by said operation unit, and
said third temperature increase start signal corresponds to the relatively small estimated value of the time period until start of said vehicle.

9. The power supply system according to claim 1, further comprising a connector configured such that electric power can be supplied and received between said power supply system and said outside of said vehicle by ensuring electrical connection between said power line and said outside of said vehicle, wherein
said plurality of types of temperature increase start signals include a fourth temperature increase start signal transmitted in response to cut-off of electrical connection between said power line and said outside of said vehicle as a result of opening of said connector, and
said mode selection unit is configured to select from among said plurality of control modes a second control mode in which balance of electric power supplied and received between said power storage unit of which temperature is to be raised and remaining said power storage unit is substantially zero, in accordance with said fourth temperature increase start signal.

10. The power supply system according to claim 9, wherein
said voltage conversion control unit is configured to control, when said mode selection unit selects said second control mode, said voltage conversion operation of said plurality of voltage conversion units such that charge/discharge electric power of said power storage unit, of which temperature is to be raised, substantially matches with charge/discharge electric power of remaining said power storage unit.

11. The power supply system according to claim 1, wherein
said mode selection unit is configured to select from among said plurality of control modes a third control mode in which electric power loss caused in said voltage conversion unit is relatively small, in accordance with said temperature increase start signal corresponding to a relatively large estimated value of the time period until start of said vehicle.

12. The power supply system according to claim 11, wherein
each of said plurality of voltage conversion units includes a chopper circuit having at least one set of switching elements, and
said voltage conversion control unit is configured to control, when said mode selection unit selects said third control mode, said voltage conversion operation of said voltage conversion unit corresponding to remaining said power storage unit such that a voltage conversion ratio of that voltage conversion unit attains to substantially 1.

13. The power supply system according to claim 11, further comprising an operation unit that is configured to output a temperature increase request in response to a remote operation by a user located outside said vehicle, wherein
said plurality of types of temperature increase start signals include a fifth temperature increase start signal transmitted in response to output of said temperature increase request by said operation unit, and
said fifth temperature increase start signal corresponds to the relatively large estimated value of the time period until start of said vehicle.

14. The power supply system according to claim 1, further comprising a connector configured such that electric power can be supplied and received between said power supply system and said outside of said vehicle by ensuring electrical connection between said power line and said outside of said vehicle, wherein
said plurality of types of temperature increase start signals include a sixth temperature increase start signal transmitted in response to a temperature increase request from said outside of said vehicle, and
said mode selection unit is configured to select from among said plurality of control modes a fourth control mode for supplying and receiving electric power between said power storage unit, of which temperature is to be raised, and said outside of said vehicle, in accordance with said sixth temperature increase start signal.

15. The power supply system according to claim 14, wherein
said load device includes
first and second rotating electric machines each configured to include star-connected stators, and
first and second inverters electrically connected to said power line, for driving said first and second rotating electric machines respectively,
said connector is configured such that electric power can be supplied and received between said power supply system and said outside of said vehicle through a first neutral point of said first rotating electric machine and a second neutral point of said second rotating electric machine, and
each of said first and second inverters is configured to be capable of converting AC electric power supplied across said first neutral point and said second neutral point to DC electric power.

16. The power supply system according to claim 1, further comprising a timer for notification of a prescribed time that has been set in advance, wherein
said plurality of types of temperature increase start signals include a seventh temperature increase start signal transmitted in response to reception of said notification from said timer, and
said mode selection unit is configured to select from among said plurality of control modes a fifth control mode in which a charge/discharge current of said power storage unit, of which temperature is to be raised, varies at a prescribed increase rate that has been set in advance, in accordance with said seventh temperature increase start signal.

17. A vehicle, comprising:

a power supply system supplying electric power to a load device mounted on a vehicle, the power supply system comprising:

a power storage mechanism configured to be charged; and a control device that is configured to carry out temperature increase control of said power storage mechanism in response to a temperature increase start instruction indicating start of temperature increase for said power storage mechanism, said temperature increase start instruction including a plurality of types of temperature increase start signals different from each other in a signal source, and said control device including a mode selection unit that is configured to select one control mode from among a plurality of control modes set in advance, in accordance with a type of said temperature increase start signal, and a temperature increase control unit that is configured to carry out temperature increase control of said power storage mechanism in accordance with said control mode selected by said mode selection unit, wherein said power storage mechanism includes a plurality of power storage units each configured to be charged, said power supply system further comprises a power line configured to be capable of supplying and receiving electric power between said load device and said power supply system, and a plurality of voltage conversion units provided between said plurality of power storage units and said power line, respectively, and each being configured to perform a voltage conversion operation between corresponding said power storage unit and said power line, and said temperature increase control unit includes a power storage unit temperature determination unit that is configured to determine whether each of temperatures of said plurality of power storage units is lower than a corresponding lower limit value of said temperature, and a voltage conversion control unit that is configured to control said voltage conversion operation of said plurality of voltage conversion units such that a temperature of said power storage unit of which temperature has been determined as being lower than said temperature lower limit value is raised and electric power is supplied and received between said power storage unit, of which temperature is to be raised, and remaining said power storage unit or outside of said vehicle, in accordance with said control mode selected by said mode selection unit; and a drive force generation unit generating drive force by receiving electric power supplied from said power supply system.

* * * * *